United States Patent
Austin

[19]
[11] Patent Number: 5,974,257
[45] Date of Patent: Oct. 26, 1999

[54] DATA ACQUISITION SYSTEM WITH COLLECTION OF HARDWARE INFORMATION FOR IDENTIFYING HARDWARE CONSTRAINTS DURING PROGRAM DEVELOPMENT

[75] Inventor: Paul F. Austin, Austin, Tex.

[73] Assignee: National Instruments Corporation, Austin, Tex.

[21] Appl. No.: 08/995,948

[22] Filed: Dec. 22, 1997

Related U.S. Application Data

[60] Provisional application No. 60/052,121, Jul. 10, 1997.
[51] Int. Cl.$^6$ ..................................................... G06F 9/44
[52] U.S. Cl. ...................... 395/708; 395/712; 395/701; 395/702; 395/703
[58] Field of Search ................................ 395/712, 183.3, 395/200, 500, 708, 701, 702, 703

[56] References Cited

U.S. PATENT DOCUMENTS

| | | | |
|---|---|---|---|
| 5,809,329 | 9/1998 | Lichtman et al. | 395/828 |
| 5,819,042 | 10/1998 | Hansen | 395/200 |
| 5,832,503 | 11/1998 | Malik et al. | 707/104 |
| 5,838,907 | 11/1998 | Hansen | 395/200 |

OTHER PUBLICATIONS

SysDraw product from MicroSystems Engineering Company version 8.0 "User's Guide", Apr. 1, 1995.
SysDraw product from MicroSystems Engineering Company version 8.0 "Image Catalog", Apr. 1, 1995.
ActiveX and Ole, David Chappel Microsoft Press, Chapter One & Nine, Introduction and ActiveX Controls, Sep. 24, 1996.
Microsoft Windows 95 Resource Kit, Chapter 19 Devices, Aug. 19, 1995.
DEC Networks and Architectures Carl Malamud pp. 83–118,199–275, 1989.
ANSI/IEEE Standard 802.3 1985 Ethernet standard printout prages 1–143, 1985.

*Primary Examiner*—Tariq R. Hafiz
*Assistant Examiner*—Todd Ingberg
*Attorney, Agent, or Firm*—Conley, Rose & Tayon; Jeffrey C. Hood

[57] ABSTRACT

A system and method for displaying DAQ device configuration information in response to program creation. The present invention preferably operates in a data acquisition (DAQ) system, wherein the DAQ system comprises a computer system and at least one DAQ device coupled to the computer system. The computer memory includes a database which stores information regarding DAQ devices. The database preferably comprises a hardware database which stores hardware capability information regarding DAQ devices, and a configuration file which stores information on the current DAQ configuration. The computer memory also includes one or more DAQ software components of the present invention. When a DAQ software component according to the present invention is included in an application program, the DAQ software component queries the database to obtain information on the DAQ device(s). In response to this obtained information, the first DAQ software component displays a hardware block diagram on the display screen. The hardware block diagram includes one or more function blocks comprised in the DAQ device which are used in the data acquisition task being performed and show the connections and signal routing between the function blocks. When the user edits one or more properties of the DAQ software component, the component again queries the database to obtain information on the DAQ device and displays an updated hardware block diagram in response to the user changes. The present invention thus provides configuration information to the user during program creation, thus simplifying application development and system configuration.

64 Claims, 10 Drawing Sheets

DATA ACQUISITION SYSTEM WITH COLLECTION OF HARDWARE INFORMATION FOR IDENTIFYING HARDWARE CONSTRAINTS DURING PROGRAM DEVELOPMENT

PRIORITY DATA

This application claims benefit of priority of provisional application Ser. No. 60/052,121 titled "System and Method for Displaying a Block Diagram in Response to Program to Enable a User to Easily Configure Flexible Hardware to Perform a Desired Measurement Task" filed Jul. 10, 1997 whose inventor was Paul F. Austin.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to software for data acquisition systems, and more particularly to a software system which displays a block diagram illustrating a DAQ hardware configuration in response to program creation to enable a user to easily understand and configure the DAQ hardware for a desired data acquisition task.

DESCRIPTION OF THE RELATED ART

An instrument is a device which collects data or information from an environment or unit under test and displays this information to a user. An instrument may also perform various data analysis and data processing on acquired data prior to displaying the data to the user. Examples of various types of instruments include oscilloscopes, digital multimeters, pressure sensors, etc., and the types of information which might be collected by respective instruments include voltage, resistance, distance, velocity, pressure, frequency of oscillation, humidity or temperature, among others.

In the past, many instrumentation systems comprised individual instruments physically interconnected with each other. Each instrument typically included a physical front panel with its own peculiar combination of indicators, knobs, or switches. A user generally had to understand and manipulate individual controls for each instrument and record readings from an array of indicators. Acquisition and analysis of data in such instrumentation systems was tedious and error prone.

A significant advance occurred with the introduction of computers to provide more flexible means for interfacing instruments with a user. In such computerized instrumentation systems, the user interacts with software executing on the computer system through the computer's video monitor rather than through a manually operated front panel to control one or more real world instruments. The software executing on the computer system can be used to simulate the operation of an instrument in software or to control or communicate with one or more real world instruments, these software created/controlled instruments being referred to as virtual instruments.

Therefore, modern instrumentation systems are moving from dedicated stand-alone hardware instruments such as oscilloscopes, digital multimeters, etc., to a concept referred to as virtual instrumentation. Virtual instrumentation comprises general purpose personal computers and workstations combined with instrumentation software and hardware to build a complete instrumentation system. In a virtual instrumentation system, a virtual instrument operating on a central computer controls the constituent instruments or data acquisition (DAQ) card(s) from which it acquires data which it analyzes, stores, and presents to a user of the system. Computer control of instrumentation has become increasingly desirable in view of the increasing complexity and variety of instruments available for use, and computerized instrumentation systems provide significant performance efficiencies over earlier systems for linking and controlling test instruments.

A data acquisition (DAQ) system comprises a computer including DAQ hardware, such as a plug-in DAQ card or board, which acquires/generates data for analysis and presentation. Scientists and engineers often use DAQ systems to perform a variety of functions, including test and measurement, laboratory research, process monitoring and control, data logging, analytical chemistry, test and analysis of physical phenomena, and control of mechanical or electrical machinery, to name a few examples.

A typical DAQ system comprises a computer system with DAQ hardware, one or more transducers, and possibly signal conditioning logic coupled between the transducers and the DAQ hardware. The transducers or other detecting means convert the physical phenomena being measured into electrical signals, such as voltage or current, measurable by the DAQ hardware. The transducers thus provide "field" electrical signals representing a process, physical phenomena, equipment being monitored or measured, etc. For example, detectors and/or sensors are used to sense the on/off state of power circuits, proximity switches, push-button switches, thermostats, relays or even the presence of positive or negative digital logic-level signals. Examples of transducers include thermocouples (temperature to voltage), RTDs (temperature to electrical resistance), strain gauges (strain to voltage), and microphones (sound to voltage).

The signal conditioning logic amplifies low-level signals and also isolates and filters signals for more accurate and safe measurements. After any signal conditioning is performed, the conditioned signals are provided to the DAQ hardware.

The DAQ hardware is typically an expansion card plugged into one of the I/O slots of the computer system. In another common DAQ system configuration, the DAQ hardware is coupled to the computer system via other means such as through a VXI (VME eXtensions for Instrurnentation) bus, a GPIB (General Purpose Interface Bus), a serial port, or parallel port of the computer system.

The DAQ device enables the computerized measurement and generation of real world analog and digital signals. The DAQ device typically includes one or more analog to digital (A/D) converters (ADCs), digital to analog (D/A) converters (DACs), digital I/O ports, and counter/timer circuits.

The DAQ hardware is configured and controlled by DAQ software executing on the computer system. The DAQ software for configuring and controlling the DAQ system typically comprises driver software and the DAQ application software, or the application. The driver software serves to interface the DAQ hardware to the application and is typically supplied by the manufacturer of the DAQ hardware or by a third party software vendor. The application is typically developed by the user of the DAQ system and is tailored to the particular function which the user intends the DAQ system to perform. The DAQ hardware manufacturer or third party software vendor sometimes supplies application software for applications which are common, generic or straightforward.

One problem encountered in creating a data acquisition application is that, in prior art systems, the user is required to create program code which configures the DAQ device for the particular application. DAQ devices for computers generally include a software library that allows engineers to access the device's hardware capabilities from conventional programming languages. A long standing set of obstacles face the users of such software libraries. First, since the user cannot see the actual hardware being configured, it can be difficult for the user to understand what specific devices or DAQ device components are required for a given task. This lead to confusion when two tasks cannot be performed at the same time due to conflicting use of hardware on the device. Also, since one library often supports many specific hardware devices, the library often does not adequately convey the limitations or special capabilities of the device the user is trying to configure. Further, in order to successfully perform a data acquisition task, the user is often required to physically wire up external signals to be measured. Considering that the software library does not adequately convey information regarding the device, it may be difficult to determine where the signal should be connected given that data acquisition devices often have 50 or more I/O signals to choose from. Finally, some task and device combinations may require addition physical connection for timing signals that are not obvious to the engineer.

Therefore, an improved DAQ system and method is desired which provides a simpler and more convenient mechanism for creating and understanding DAQ applications and configuring DAQ hardware in a DAQ instrumentation system.

SUMMARY OF THE INVENTION

The present invention comprises a system and method for displaying DAQ device configuration information in response to program creation. The present invention preferably operates in a data acquisition (DAQ) system, wherein the DAQ system comprises a computer system including a CPU, a memory, and a display screen. At least one DAQ device coupled to the computer system, wherein the DAQ device is operable to generate/receive data.

The computer memory includes a database which stores information regarding DAQ devices. The database preferably comprises a hardware database which stores hardware capability information regarding DAQ devices, and a configuration file which stores information on the current DAQ configuration.

The computer memory also includes one or more DAQ software components of the present invention. Each of the one or more DAQ software components is operable to perform a data acquisition task, and each is useable in creating an application program. Each of the DAQ software components also includes a property page or other means for configuring properties or attributes of the component.

When a first DAQ software component according to the present invention is included in an application program, the first DAQ software component queries the database to obtain information on the DAQ device(s). In response to this obtained information, the first DAQ software component displays a hardware block diagram on the display screen.

The hardware block diagram includes one or more function blocks comprised in the DAQ device which are used in the data acquisition task performed by the first DAQ software component. In the preferred embodiment, the hardware block diagram displays restrictions and capabilities of the DAQ device. The hardware block diagram also illustrates internal connections and required external connection of the DAQ device which are used in performing the data acquisition task. The hardware block diagram further illustrates pin number and signal routing information.

When the user edits one or more properties of the DAQ software component, the component again queries the database to obtain information on the DAQ device and displays an updated hardware block diagram in response to the user changes.

Therefore, the present invention comprises a system and method for creating applications in an instrumentation system. The present invention provides configuration information to the user, thus simplifying application development.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

U.S. provisional application Ser. No. 60/052,121 titled "System and Method for Displaying a Block Diagram in Response to Program Configuration to Enable a User to Easily Configure Flexible Hardware to Perform a Desired Measurement Task" filed Jul. 10, 1997 whose inventor was Paul F. Austin, is hereby incorporated by reference in its entirety as though fully and completely set forth herein.

U.S. patent application Ser. No. 08/943,784 titled "Configuration Manager for Configuring a Data Acquisition System" filed Oct. 3, 1997, (Docket 5150-17500) whose inventors are Meg Fletcher Kay, Jonathan Brumley, Howard Tsoi, and Kurt Carlson, and which was assigned to National Instruments Corporation, is hereby incorporated by reference as though fully and completely set forth herein.

U.S. patent application Ser. No. 08/644,119 titled "System and Method for Editing a Control Via a Preview Window" filed May 9, 1996, (Docket 5150-15500) whose inventors are Jeff D. Washington and Paul F. Austin, and which was assigned to National Instruments Corporation, is hereby incorporated by reference as though fully and completely set forth herein.

DAQ System

Figure 1:
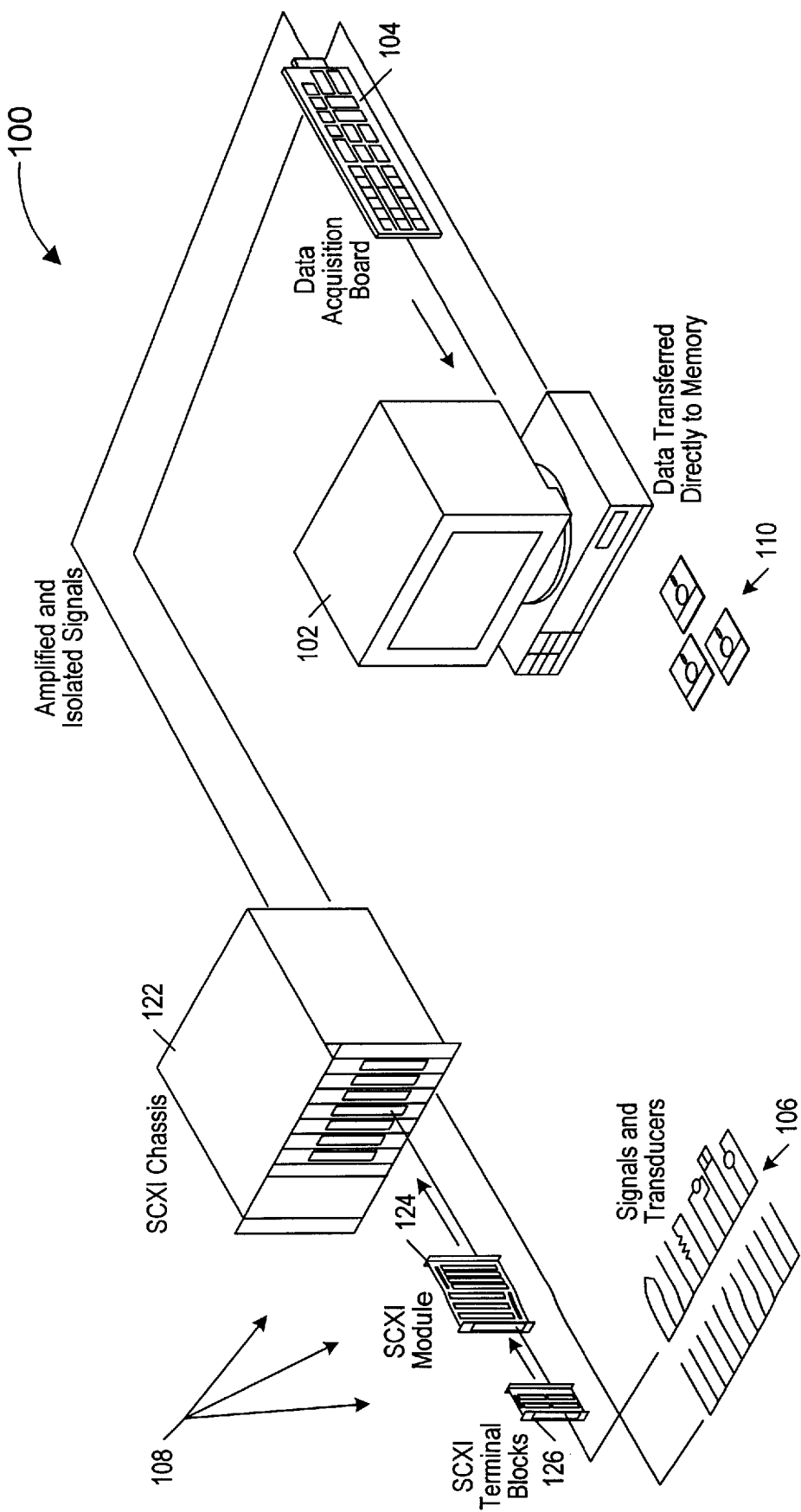
FIG. 1 illustrates a data acquisition (DAQ) system according to the present invention.

Referring now to FIG. 1, an illustrative data acquisition (DAQ) system 100 according to the present invention is shown. The term "data acquisition" used in this specification is intended to encompass data generation as well as data acquisition, particularly as applied to instrumentation, process control and industrial automation systems.

The DAQ system 100 comprises a computer 102 having an operating system and other software, a DAQ device or DAQ hardware board 104 coupled to the computer 102, and transducers 106 or other detecting means which provide field electrical signals to/from the DAQ device 104, optionally through signal conditioning logic 108.

The computer 102 includes various standard elements, including at least one central processing unit (CPU), memory, a hard drive, one or more buses, and a power supply. The computer 102 preferably includes an installation media, e.g., CD-ROM, tape drive, or floppy disks 110, on which computer programs according to the present invention are stored. The host computer 102 also preferably includes a non-volatile media, such as a magnetic media, e.g., a hard drive, or optical storage, as well as system memory, such as DRAM, SRAM etc. The software programs of the present invention are also stored in the system memory and/or hard drive of the computer 102 and executed by the CPU. The CPU executing code and data from the memory thus comprises a means or step for displaying configuration information for the DAQ device 104 according to the description below.

In one embodiment, the computer 102 comprises input/output (I/O) slots into which the DAQ device 104 is coupled. In the embodiment of FIG. 1, the DAQ device 104 is a DAQ board or DAQ card adapted for insertion into an expansion slot of the computer system 102. The DAQ board 104 is shown external to the computer system 102 in FIG. 1 for illustrative purposes. In another embodiment, the DAQ device 104 is coupled to the computer 102 by a VXI (VME Extensions for Instrumentation) chassis and bus, a GPIB (General Purpose Interface Bus), a serial port or a parallel port. The DAQ device may also comprise other form factors, such as a PC Card conforming to the PCMCIA specification, or a PXI module, among others.

In one embodiment, the transducers 106 are coupled directly to the DAQ device 104. In another embodiment, the signals received by the transducers 106 are conditioned by the signal conditioning circuitry 108 for presentation to the DAQ device 104 as shown. In the embodiment of FIG. 1, the signal conditioning circuitry 108 comprises an SCXI (Signal Conditioning Extensions for Instrumentation) chassis 122, one or more SCXI modules 124, and optionally one or more SCXI terminal blocks 126. SCXI is an open architecture, multichannel signal conditioning front-end system for DAQ devices. SCXI comprises an external chassis housing signal conditioning modules for amplifying, multiplexing, and isolating field signals. The signal conditioning modules advantageously reduce the introduction of noise into the signals transmitted to the DAQ device 104.

The transducers 106 and other detecting means provide the field signals representing a process, physical phenomena, equipment being monitored or measured, etc. to/from the DAQ device 104. Examples of the transducers 106 are strain gauges, thermocouples, thermistors, photoconductive cells, microphones, and piezoelectric transducers, among others.

Examples of DAQ device 104 are the following products available from National Instruments Corporation: the AT-MIO-16 series analog input boards, the AT-AO-6/10 series analog output boards, the PC-DIO-96 digital I/O board, and the PC-TIO-10 counter/timer I/O board. Examples of the SCXI circuitry 22 are the National Instruments Corporation: SCXI-1000 4-slot chassis, the SCXI-1100 32-channel multiplexer amplifier module, and SCXI-1160 16-channel power relay module.

Although in the preferred embodiment the software of the present invention is involved with displaying block diagrams for configuring a DAQ device or other instruments, it is noted that the present invention can be used for a plethora of applications and is not limited to instrumentation or industrial automation applications. In other words, FIG. 1 is exemplary only, and the present invention may be used in any of various types of systems.

Computer System Block Diagram

Figure 2:
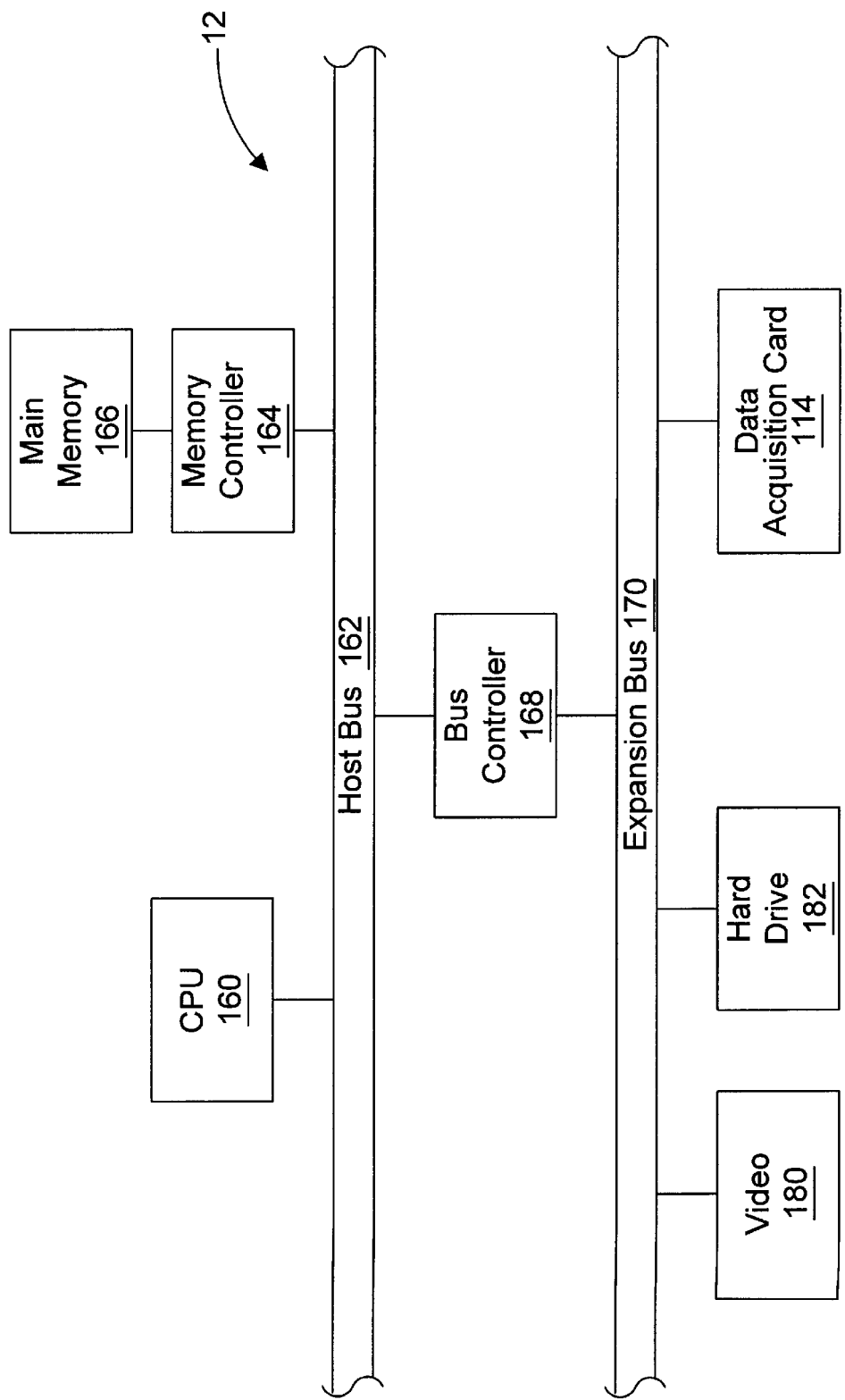
FIG. 2 is a block diagram of the computer system of FIG. 1.

Referring now to FIG. 2, a block diagram of the computer system illustrated in FIG. 1 is shown. It is noted that any type of computer system configuration or architecture can be used as desired, and FIG. 2 illustrates a representative PC embodiment. It is also noted that the computer system may be a general purpose computer system as shown in FIG. 1, a computer implemented on a VXI card installed in a VXI chassis, a computer implemented on a PXI card installed in a PXI chassis, or other types of embodiments. The elements of a computer not necessary to understand the operation of the present invention have been omitted for simplicity The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 stores a component development system and software components or objects according to the present invention. The main memory 166 also stores DAQ driver software and various other software. The main memory 166 also stores operating system software as well as the software for operation of the computer system, as well known to those skilled in the art. The component software will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 104 (of FIG. 1. The computer 102 further comprises a video display subsystem 180 and hard drive 182 coupled to the expansion bus 170.

Figure 3:
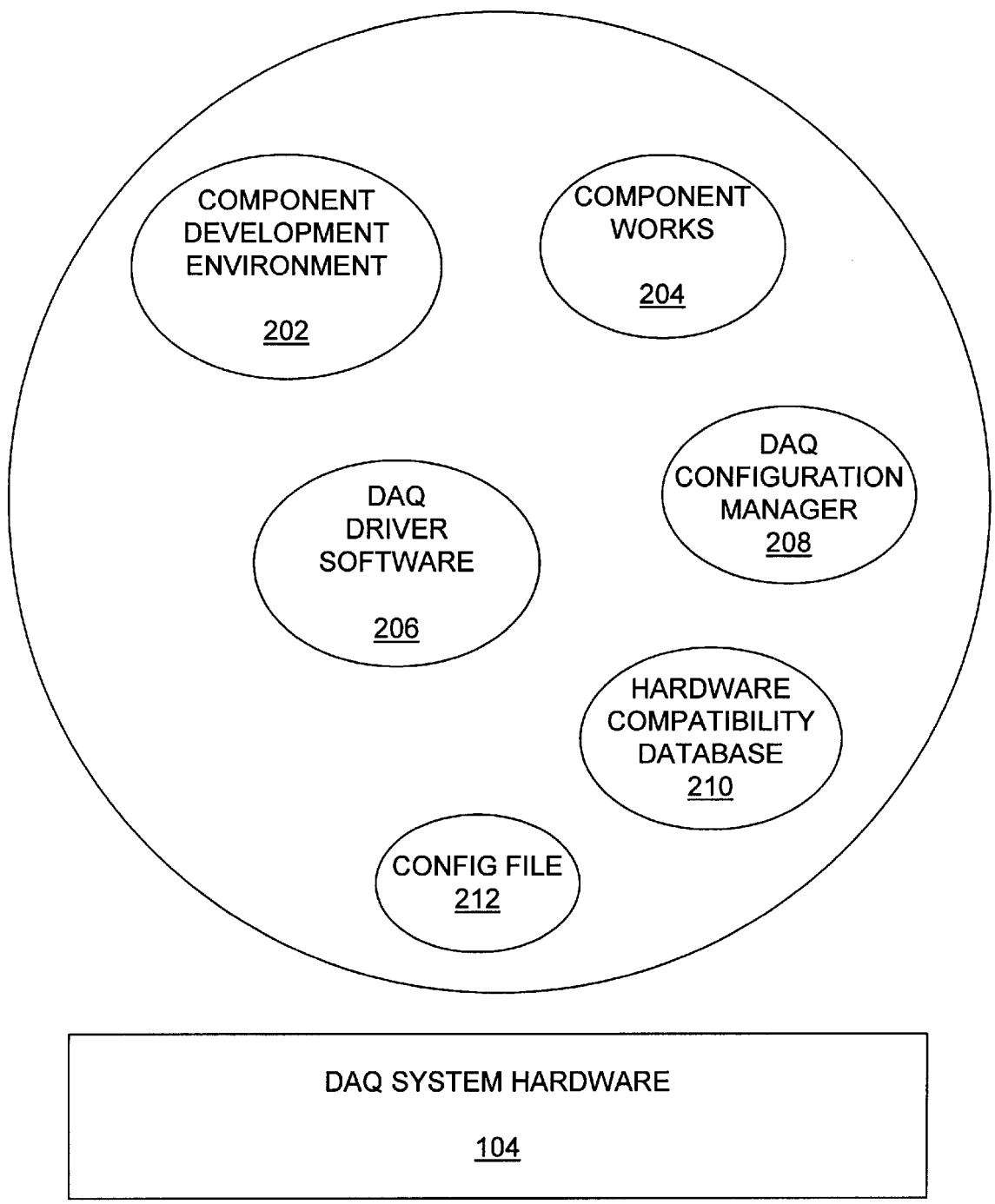
FIG. 3 illustrates the software architecture of the computer system according to the present invention.

FIG. 3—DAQ Software Components

FIG. 3 illustrates the software components or elements comprised in the DAQ system according to the preferred embodiment. As shown, the DAQ system includes a component development system 202, such as Visual Basic, Visual C++ or Delphi, among others. In the present disclosure, the term "component development system" is intended to include component-based development systems as well as object-based or object-oriented development systems. The term "component development system" may also comprise a graphical programming system, e.g., LabVIEW, or other types of development environments such as LabWindows\CVI, HP VEE, etc. The term "development program" includes component development systems as well as other programs used for developing or creating application programs.

The DAQ system includes one or more components or software objects according to the present invention. In the preferred embodiment, the DAQ system stores the ComponentWorks components produced by National Instruments Corporation. The components of the present invention include methods for drawing block diagrams illustrating DAQ hardware configurations. As used herein the term "component" includes various types of reusable software components or elements, such as controls, e.g., ActiveX controls, software objects, and graphical sub-diagrams or sub-VIs, among others.

The DAQ system also includes DAQ driver software, preferably NI-DAQ driver software produced by National Instruments Corporation. The DAQ driver software interfaces between DAQ applications and the DAQ hardware being controlled by the DAQ application.

The DAQ system also includes a DAQ Configuration Manager 208, a Hardware Capability Database 210, and a configuration file 212. The Configuration Manager 208 interfaces to the Hardware Database 210 and the configuration file 212.

The Hardware Capability Database 210 stores hardware information on DAQ devices. More generally, the Hardware Database 210 stores configuration information and capabilities of various DAQ objects which may be comprised in the DAQ system 100. For example, the Hardware Database 210 stores information on the various types of data acquisition cards or boards 104 which can be used in the data acquisition system 100. In the preferred embodiment, the hardware database 210 stores information on data acquisition devices available from National Instruments Corporation.

In the present disclosure, the term "DAQ object" refers to data acquisition objects which can be included in a DAQ system, such as a DAQ interface card, SCXI modules, an SCXI chassis, SCXI accessories such a terminal blocks, cables, and a virtual channel created using the DAQ Channel Wizard. The term "DAQ object" is also used to refer to a software object which corresponds to the physical DAQ object. The possible attributes or parameters of a DAQ object in the data acquisition system 100, such as the DAQ card 104, include pin numbers for various signals, the range of input values (voltages, currents, etc.) which the DAQ device 104 will acquire; the manner of coupling the DAQ device 104 to the field signals (e.g., DC or AC); the input mode of the acquired signals (e.g., differential or single-ended); various acquisition trigger related attributes such as trigger mode, trigger source, trigger action, trigger level, etc.; attributes relating to acquisition clocks; the size of the buffer for receiving the acquired data; and the engineering units associated with the values of the acquired data.

The DAQ system 100 also preferably includes a configuration file 212 which is used to store a particular configuration of the DAQ system 100 created by a user or user application. Each time the DAQ system 100 boots up the saved configuration or configuration file 212 can be accessed and used to configure the DAQ system 100 with a preferred configuration. The Configuration Manager 208 further communicates with the saved configuration or user configuration files 212.

As used herein, the term "database" is intended to include the Hardware Database 210 and the configuration file 212, as well as other data structures or files for storing information in DAQ devices.

The DAQ system also preferably includes a DAQ configuration utility (not shown). The DAQ configuration utility is preferably the NI-DAQ Configuration Utility produced by National Instruments Corporation. The NI-DAQ Configuration Utility is used to configure DAQ boards and to assign each DAQ board a device number. If any SCXI devices are being installed, the NI-DAQ Configuration Utility is executed to input the SCXI configuration.

The NI-DAQ Configuration Utility creates the configuration file 212 that informs other DAQ configuration utilities or clients which DAQ devices—DAQ plug-in boards, stand-alone DAQ products, or SCXI modules—the user has in the system, and how they are configured physically. This utility runs when the user installs or un-installs a DAQ device. For DAQ devices, the NI-DAQ Configuration Utility is used to configure addresses, interrupt levels, Direct Memory Access (DMA) channels, and other settings. For SCXI Chassis and Modules, the NI-DAQ Configuration Utility is used to configure addresses and other settings.

The Configuration Manager 208 also communicates with a system settings manager (not shown) which stores system specific information regarding the DAQ system 100.

The Configuration Manager 208 comprises the programmatic interface to the hardware database 210 and the configuration file 212, as well as the system settings manager. For example, if a user application or component desires to determine whether a certain DAQ product has certain capabilities, the user application or component makes a request to the Configuration Manager 208 which in turn queries the hardware database 210 for the respective information. The hardware database 210 is preferably updated with new information as new DAQ boards or DAQ devices are introduced. In a similar manner, if a user application or component desires to know certain system settings, the user application makes a request to the Configuration Manager 208 which in turn queries the system settings manager 222 for the respective information. Also, if a user application desires to restore a saved configuration or learn about which DAQ devices are installed in the system, the user application makes a request to the Configuration Manager 202 which in turn accesses the appropriate configuration file 212.

The Configuration Manager 202 essentially operates as a server to one or more clients. According to the preferred embodiment, DAQ software components of the present invention are operable as clients to the Configuration Manager 208. More specifically, the DAQ software components can make requests to obtain information on DAQ devices through the Configuration Manager 208. For more information on the Configuration Manager 208 and its API, the Hardware Database 210, and configuration files 212, please see U.S. patent application Ser. No. 08/943,784 titled "Configuration Manager for Configuring a Data Acquisition System" filed Oct. 3, 1997, incorporated by reference above.

Each DAQ software component of the present invention comprises a first DAQ function portion which is executable to perform a DAQ task, and a display method of the present invention. In response to the DAQ software component being included in an application program, the display method in the DAQ software component is operable to query the database to obtain information on the DAQ device 104 and is operable to display a hardware block diagram on the display screen based on the obtained information.

Figure 4:
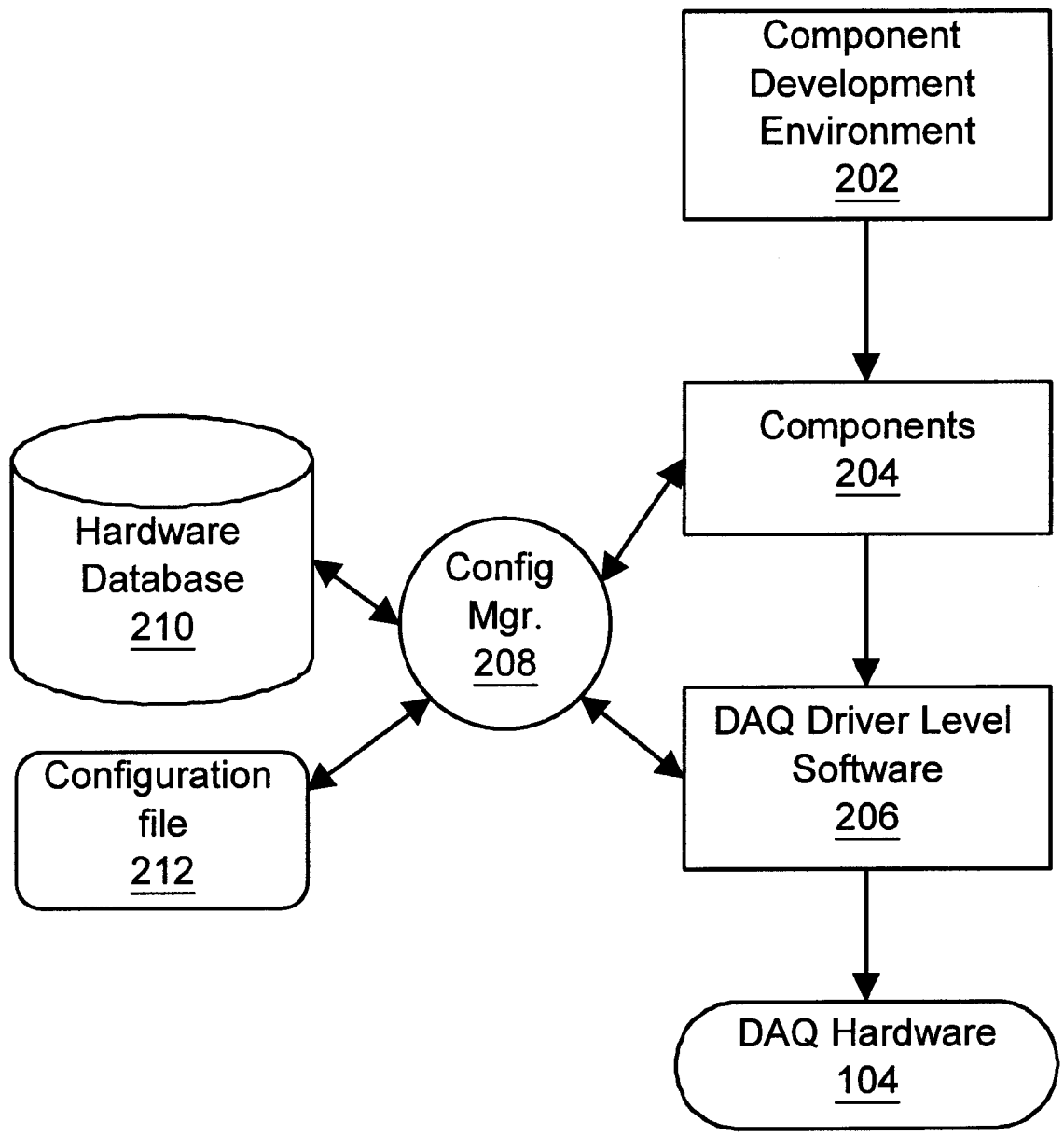
FIG. 4 is a hierarchical view of the software architecture of the computer system according to the present invention.

FIG. 4—Software Architecture

FIG. 4 illustrates the hierarchical relationship of the software components shown in FIG. 3. The component development environment or system 202 is preferably used for the creation of software applications for controlling the DAQ system 100.

As shown, the component development environment 202 utilizes components, such as components available in the ComponentWorks program 204. As discussed above, the software components according to the present invention are operable to display block diagram information which conveys DAQ configuration information regarding the DAQ device 104 used in the DAQ system 100. A user or programmer utilizes the software components in the component works program 204 and the component development environment 202 in creating a DAQ application.

The component development environment and/or the components in the Component Works program 204 interface through DAQ driver level software 206 to the DAQ device 104. More particularly, applications which include components of the present invention interface through the DAQ driver level software 206 to the DAQ device 104. In the preferred embodiment, the DAQ driver level software is NI-DAQ from National Instruments Corporation. The DAQ driver level software 206 is executable to control and/or communicate with the DAQ device 104.

As shown, each of the components of the present invention 204 and the DAQ driver level software 206 are operable to access the DAQ Configuration Manager 208 to access the Hardware Database 210 and the configuration file 212. In the preferred embodiment, the DAQ driver level software 206, the Configuration Manager 208, the Hardware Database 210, and the configuration file 212 are comprised in the NI-DAQ driver software product available from National Instruments Corporation.

Figure 5:
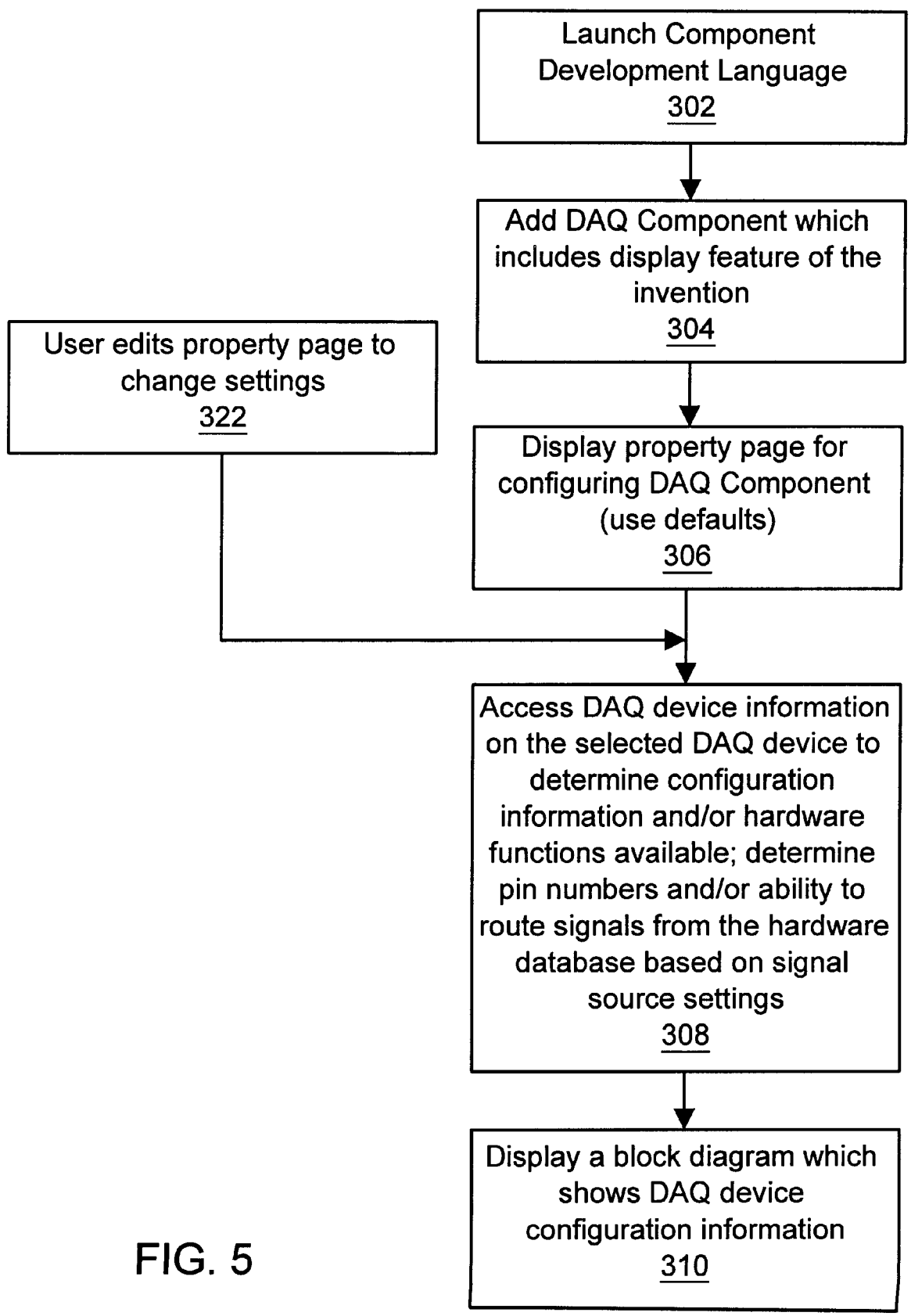
FIG. 5 is a flowchart diagram illustrating creation of a user application according to the present invention.

FIG. 5—Flowchart Diagram

FIG. 5 is a flowchart diagram illustrating operation of the present invention. As shown, in step 302 the user launches the component development environment or component development language 202 to begin creation of a DAQ application.

In step 304 the user adds a DAQ component which includes a display feature according to the present invention. Thus, in step 304 the user adds a component, e.g., from the ComponentWorks program, to the DAQ application being created using the component development environment 202. The DAQ component added to the program includes software according to the present invention which displays a block diagram illustrating DAQ device configuration information.

In step 306 the component development environment 202 displays a property page for configuring the DAQ component. Preferably the property page is initially displayed using the default values obtained from the DAQ component. It is noted that other methods may be used to configure the DAQ component, as desired.

In response to the DAQ component being added to the DAQ application, in step 308 a software method comprised in the DAQ component operates to access configuration information and/or hardware capability information in the configuration file 212 and/or the hardware database 210. The DAQ component accesses hardware capability information on the selected DAQ device 104 to determine the available hardware functions. The DAQ component may also access configuration information on the present configuration from the configuration file 212 to determine which DAQ devices are installed in the system, as well as their current configuration.

Thus, the DAQ component preferably makes a request to the Configuration Manager 208 to access hardware information and/or configuration information on the selected DAQ device 104 to determine the type or kind of DAQ device 104 as well as the available hardware functions, capabilities and/or configuration of the DAQ device. It is noted that where the DAQ system includes a plurality of DAQ devices, the component preferably operates to access DAQ hardware/configuration information on the DAQ device(s) currently selected in the property page. When the DAQ component is first dropped in an application, this will typically comprise the default DAQ device. The DAQ component operates to access the Hardware Database 210 to determine PIN numbers of the DAQ device and/or the ability of the DAQ device 104 to route signals based on signal source settings in the property page.

In response to the DAQ component accessing DAQ device information in step 308, in step 310 the display method in the DAQ component operates to display a block diagram which shows the DAQ device configuration information to the user. The displayed block diagram includes one or more function blocks comprised in the DAQ device which are used in the data acquisition task performed by the DAQ software component included in the application in step 304. More particularly, the block diagram displays a visual representation of one or more hardware blocks or elements in the DAQ device, as well as the interconnection between the blocks, to provide a visual indication to the user of the DAQ device configuration required for the measurement being performed.

In the preferred embodiment, the hardware block diagram displays restrictions and capabilities of the DAQ device. The hardware block diagram also illustrates internal connections and required external connection of the DAQ device which are used in performing the data acquisition task. Internal connections are preferably displayed with a dotted line. External connections which are required to be made by the user are preferably displayed with a solid line. The hardware block diagram further illustrates pin number and signal routing information. The method in the DAQ component also preferably displays a textual message providing information to the user on the measurement being performed, as well as the configuration of the DAQ device. This information is helpful to the user in determining usage of the hardware capabilities of the DAQ device, as well as the pin numbers used and the necessary signal routing which may be required to be performed by the user.

As noted above, the user can edit the property page to change the settings, i.e., to change the settings from the default settings or to edit previously edited settings. In response to user edits, the DAQ component again operates to access the hardware capability information and or configuration information in step 308 and to display an updated block diagram in step 310 which shows the updated DAQ device configuration information based on the newly edited settings. For example, if the user selects a different DAQ device in the property page, the DAQ component operates to access the hardware capability information and or configuration information on the newly selected DAQ device in step 308 and to display an updated block diagram in step 310.

The present specification includes example source code below which further describes the operation of steps 308 and 310.

FIGS. 6–10: Screen Shots

Figure 6:
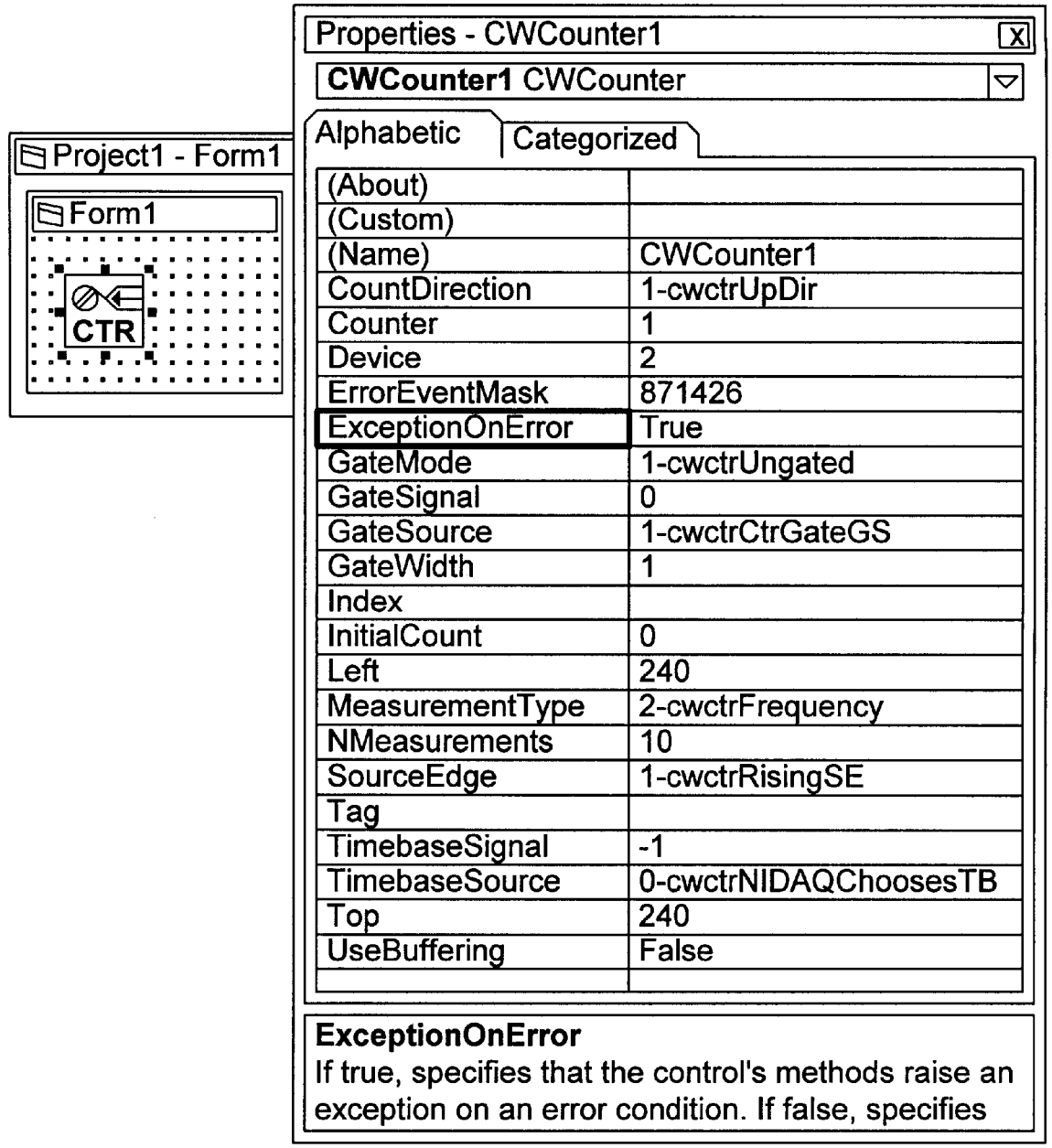
FIGS. 6–10 are screen shots illustrating operation of the present invention.

FIGS. 6–10 are screen shots illustrating operation of the present invention. FIG. 6 illustrates a component, also referred to as a control, which includes the display function of the present invention, inserted into a form of a component development environment 202. In the preferred embodiment, the control or component is an OLE/Active X control. The control is used for programming hardware. It is noted that FIG. 6 also illustrates the typical operation of inserting any type of control, i.e., whether the control includes features of the present invention or not, into a development environment.

Figure 7:
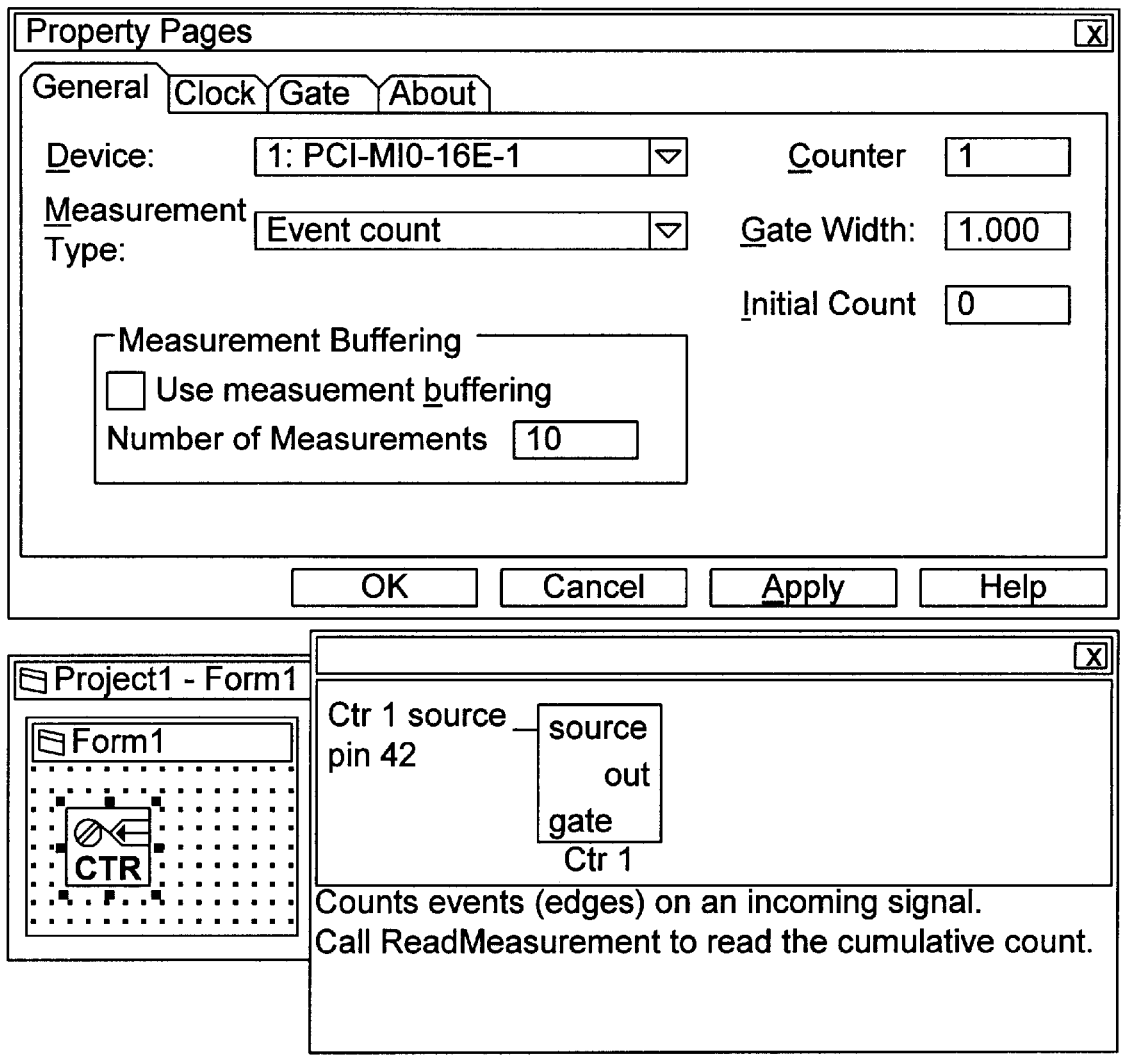

FIG. 7 illustrates a property page for the control wherein the "General" tab is selected. As shown, the property page illustrates that the device is device 1, which is a PCI-MIO-16E-1 device. The property page also illustrates that the measurement type is event count and counter 1 is selected.

FIG. 7 also illustrates the corresponding DAQ Block Diagram window which is displayed when the property page is configured as shown. The block diagram window shows the hardware function blocks that are used to perform an event count measurement. Here the block diagram illustrates that the measurement being configured only requires one counter, counter 1, and no other counter is required to be used. Thus, this indicates to the user that other counters may be used for other tasks. As shown, the block diagram also provides a message to the user which states that the configured measurement "Counts events (edges) on an incoming signal. Call ReadMeasurement to read the cumulative count." Thus, the block diagram window or preview window illustrates a block diagram showing the hardware function blocks used, the interconnection between the blocks, and pin numbers, as well as a textual message which provides information to the user on the measurement being performed.

Figure 8:
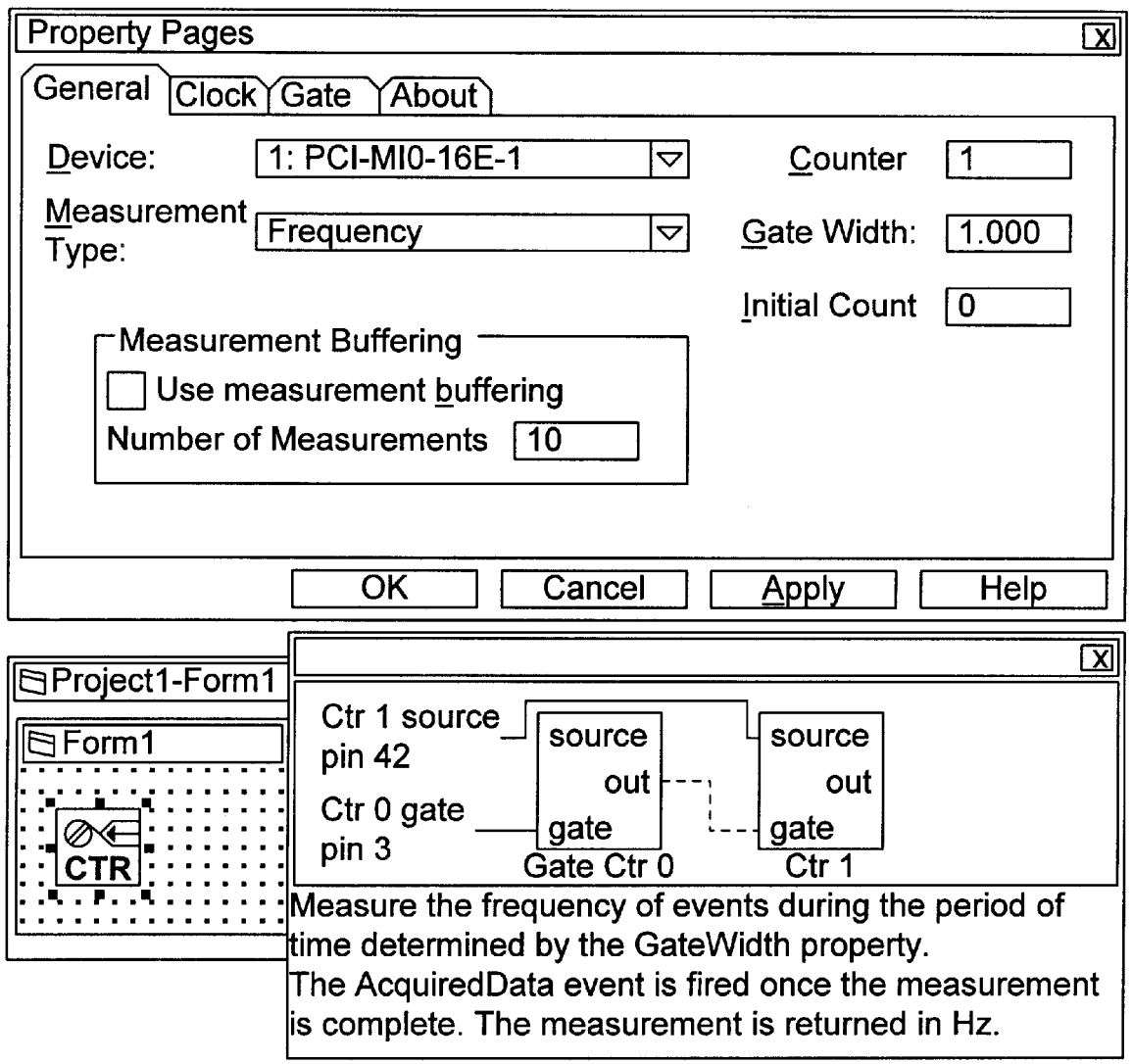

FIG. 8 illustrates a property page wherein the measurement type in the property page has been changed to a frequency measurement type from the event count measurement type shown in FIG. 7. As discussed above, when edits are made to the property page, the block diagram window is updated accordingly. In FIG. 8, the corresponding DAQ block diagram window shows the hardware function blocks that are used to perform a frequency measurement. In this example, two counters are required. As shown, on the property page the user has selected counter 1, and in response the block diagram window shows the user that counter 0 is also required to be used. This indicates to the user that counter 0 cannot be used for another task at the same time. In the block diagram window, the dashed line between the two function blocks indicates that for this device, e.g., the National Instruments PCI-MIO-16E-1, the signal is internally routed and that a physical connection is not necessary. The solid line indicates that an external connection is required to be made by the user. The block diagram window thus indicates that for this measurement to be performed on this specific device, the source signal should be wired to PIN 42 and the gate controlling signal should be wired to PIN 3. The preview window also provides a textual message explaining the measurement being performed to the user. This textual message states that this measurement "Measures the frequency of events during the period of time determined by the GateWidth property. The AcquiredData event is fired once the measurement is complete. The measurement is returned in Hz."

Figure 9:
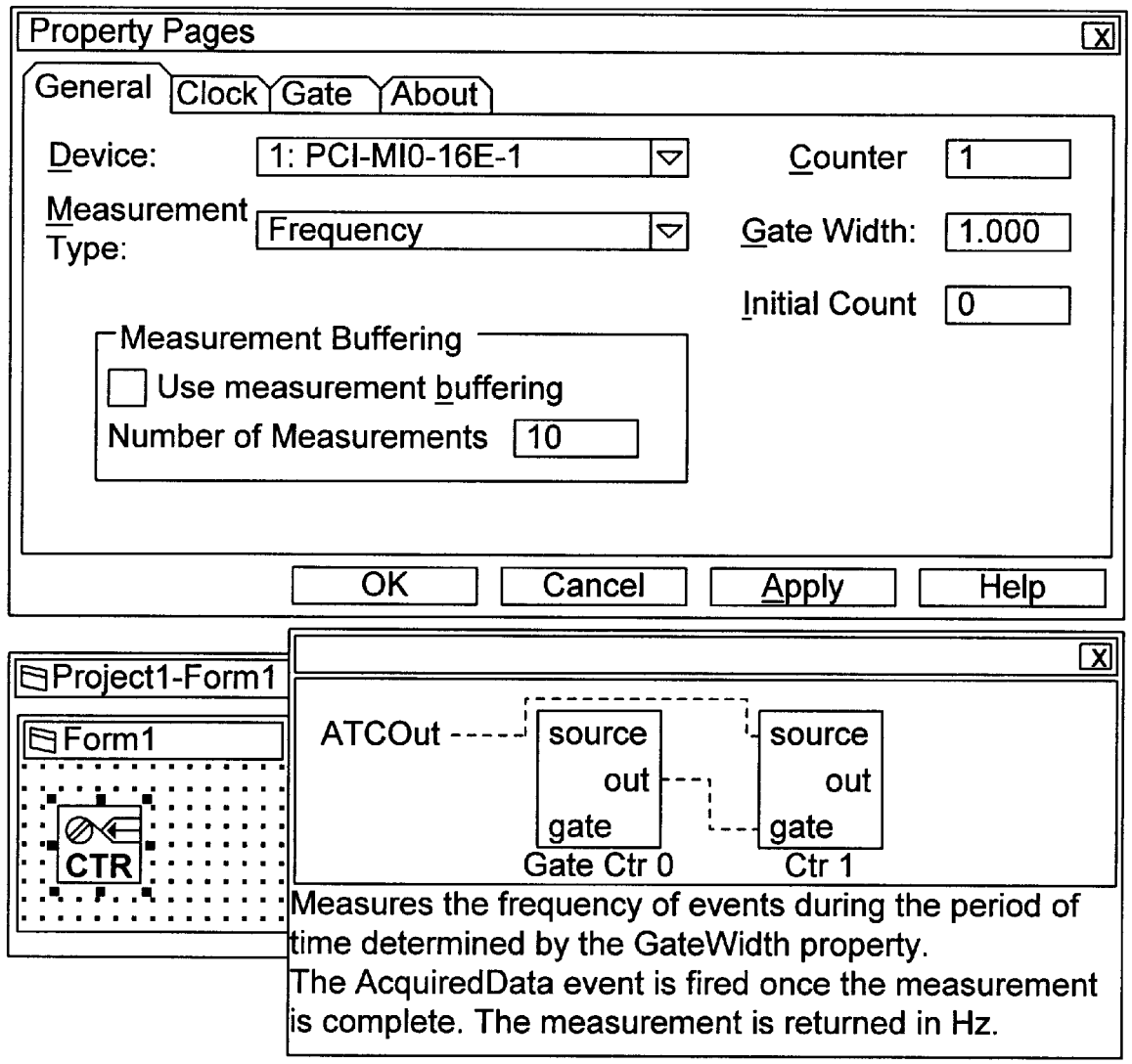

FIG. 9 illustrates the property page and corresponding DAQ block diagram window, wherein the user has edited the property page from its state in FIG. 8. In FIG. 9, the same measurement is being made with the following modifications. First, the signal being measured has been changed to come from an internal source called ATCOut (Analog Trigger Circuit Output). Also, the user has disabled the additional gate control signal. It is noted that these changes are not reflected in the "General" tab shown in FIG. 9. Rather, these changes were made by selecting the Clock and/or Gate tab and then editing parameters on those tabs of the property page. In FIG. 9, both signal connections are shown with dashed lines, meaning that these connections are internal connections. The DAQ block diagram window thus displays a concise summary of the task indicating which counters are actually used and which connections the user is required to make, which are none in this example.

Figure 10:
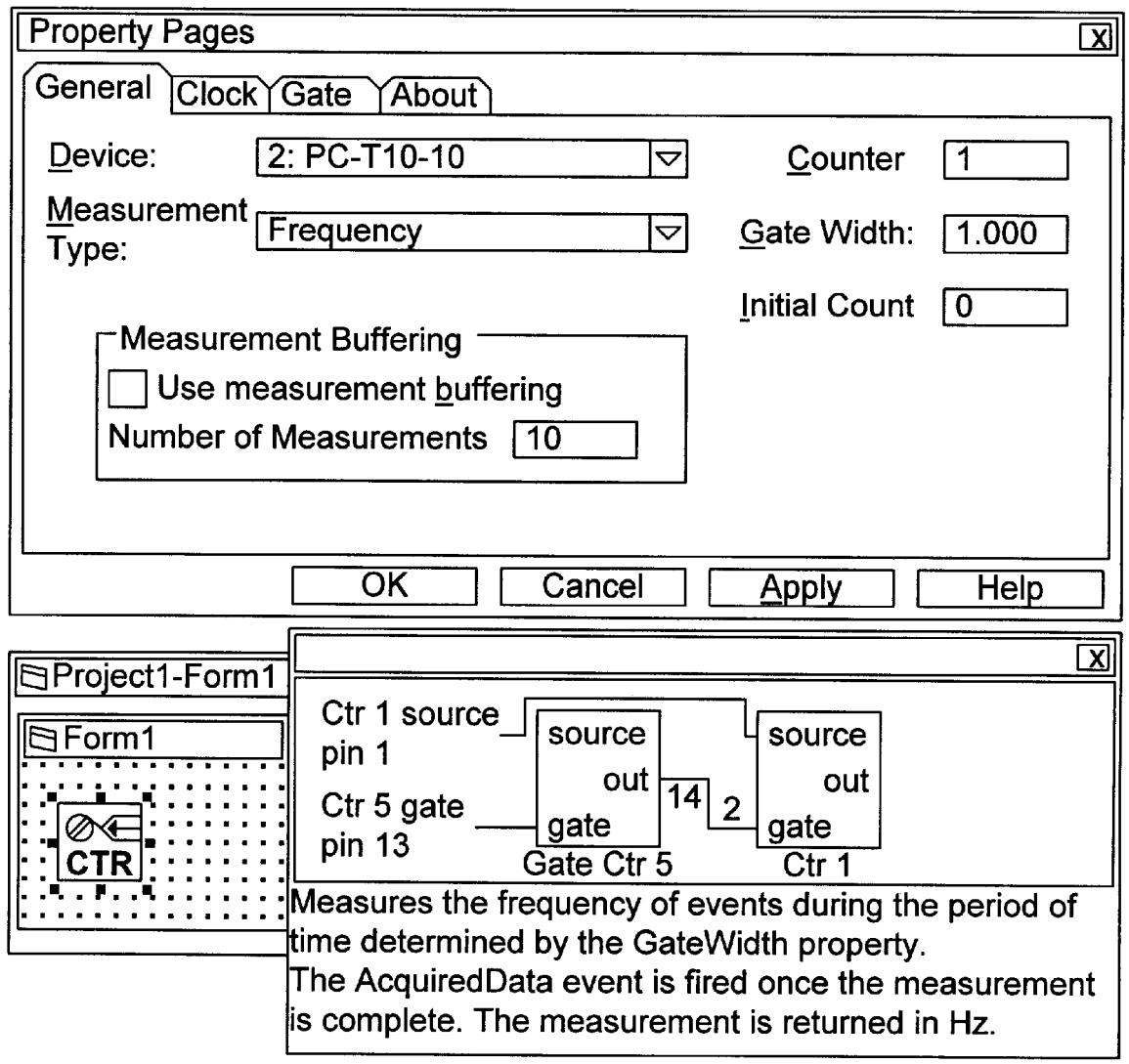

FIG. 10 also illustrates edits made from the property page in FIG. 8. The property page in FIG. 10 differs from the property page in FIG. 8 in that a different device, a National Instruments PC-TIO-10, has been selected. All other settings are the same relative to the property page in FIG. 8. As shown in the block diagram for this device, an additional connection is required to be made between pins 14 and 2 since this connection cannot be automatically routed on this device. Also, it is noted that the source and gate signals are wired to different pins on this device, pin 1 and 13 respectively. Further, a different counter, counter 5, i.e., not counter 0, is used in addition to the primary counter, counter 1, selected by the user.

Source Code

The following comprises source code which further describes operation of steps 308 and 310. This source code is written in C++ and make use of Microsoft's Foundation Class libraries (MFC).

The first file, titled "ppctrpreview.h" includes a description of a class that includes methods that are used for implementing a window that displays the block diagram to the user.

The second file, titled "ppctrpreview.cpp" includes the implementation of the methods described in the previous file. The method named CPPCtrPreview::OnPaint(), and the method called by this method, have the net affect of rendering the Block diagram on the screen.

The third file titled "DAQCounter.h" includes a description of a class that includes methods that are used to extract information from the DAQ Configuration Manager API and convert the data into information necessary for the class defined in ppctrpreview.h. For example, this file includes the code used to construct the actual text names used on the input and output signals in the block diagram, based on information found in the database.

The fourth file titled "DAQCounter.cpp" includes the implementation of the class described in DAQCounter.h

```
//----------------------------------------------------------------------
//----------------------------------------------------------------------
//----------------------------------------------------------------------
// NATIONAL INSTRUMENTS CONFIDENTIAL
//
// ppctrpreview.h
//
// © Copyright 1997 National Instruments
//
// TGBTG ifndef __PPCRTPREVIEW_H__
define __PPCRTPREVIEW_H__ include "cwctlobj.h"
include "pppreview.h"

class CCWCtrTimer;
class CPPCtrPreview : public CPPPreview
{
      typedef CPPPreview CParent;

// Construction
public:
      CPPCtrPreview();
      virtual    void   Invalidate(BOOL bErase = FALSE);
      CW_OBJ_WRAPPER_GET(CCWCtrTimer, m_pCtrl);

// Implementation
protected:
      // Generated message map functions
      //{{AFX_MSG(CDlgFrame)
      afx_msg void OnPaint();
      afx_msg void OnLButtonDown(UINT nFlags, CPoint point);
      //}}AFX_MSG
      DECLARE_MESSAGE_MAP()
private:
      void DrawWire(CPaintDC *pdc, CString &strSig, CString& strPin,
CPoint pt,
                    int16 wWidth, BOOL bLeft);

void  RefreshHelpText();
```

```
        BOOL    m_bHelpValid;
        BOOL    m_bTwoCounters;
        BOOL    m_bUseOutput;
        BOOL    m_bUseGate;
        BOOL    m_bInvalidHW;
        BOOL     m_bShowPins;
        BOOL      m_bNotSupported;

CString m_strTBSig;
        CString m_strGateSig;
        CString m_strOutSig;
        CString m_strTBPin;
        CString m_strGatePin;
        CString m_strOutPin;
        CString     m_strConSrc; // for connecting two counters
        CString     m_strConDst;
};

#endif // __PPCRTPREVIEW_H__
```

```cpp
//---------------------------------------------------------------------------
//---------------------------------------------------------------------------
//---------------------------------------------------------------------------
// NATIONAL INSTRUMENTS CONFIDENTIAL
//
// ppctrpreview.cpp
//
// © Copyright 1997 National Instruments
//
// $Header: /Pyramid/CWDaq/ppctrpreview.cpp 16    6/09/97 5:52p Winkeler
$
//
// TGBTG include "stdafx.h"

include "environ.h"
#include "debug.h"
#include "pulse.h"
#include "resource.h"
#include "hwdb.h"

#include "ppctrpreview.h"

#ifdef _DEBUG
#undef THIS_FILE
static char BASED_CODE THIS_FILE[] = __FILE__;
endif CPPCtrPreview::CPPCtrPreview()
      : CPPPreview(IDD_PP_CTRPREVIEW)
{
      m_bHelpValid = FALSE;
      m_bShowPins = FALSE;
}

BEGIN_MESSAGE_MAP(CPPCtrPreview, CPPPreview)
      //{{AFX_MSG_MAP(CPPCtrPreview)
      ON_WM_PAINT()
      ON_WM_LBUTTONDOWN()
      //}}AFX_MSG_MAP
END_MESSAGE_MAP()

//---------------------------------------------------------------------------
void CPPCtrPreview::Invalidate(BOOL bErase /* = FALSE */)
{
      m_bHelpValid = FALSE;
      CParent::Invalidate(bErase);
}

//---------------------------------------------------------------------------
void CPPCtrPreview::RefreshHelpText()
{
```

```
        if (m_bHelpValid)
                return;

CCWCtrTimer     *pCtrTimer = GetCCWCtrTimer();
        CDaqCounterInfo ctrInfo(pCtrTimer->GetDevice(), pCtrTimer-
>GetCounter());

UINT    wID = 0;
        // Get description appropriate for the current task.
        CString     strHelp;

if (pCtrTimer->IsKindOf(RUNTIME_CLASS(CCWPulse))) {
                CCWPulse *pPulse = CCW_SAFECAST(pCtrTimer, CCWPulse);
                switch (ctrInfo.GetCtrType()) {
                case kCfqValDAQSTC:
                        switch (pPulse->GetPulseType()){
                                case cwpulseSingle:                         wID =
IDS_HelpPulseSingle;            break;
                                case cwpulseContinuous:             wID =
IDS_HelpPulseContinuous;        break;
                                case cwpulseFSK:                    wID =
IDS_HelpPulseFSK;               break;
                                case cwpulseIncrementalDelay: wID =
IDS_HelpPulseIncremental; break;
                                case cwpulseFinite:                         wID =
IDS_HelpPulseFinite;            break;
                                case cwpulseRetrigRisingEdge: wID =
IDS_HelpPulseRetrigRising;break;
                                case cwpulseRetrigFallingEdge:      wID =
IDS_HelpPulseRetrigFalling;break;
                                }
                        break;
                case kCfqValAM9513:
                        switch (pPulse->GetPulseType()){
                                case cwpulseRetrigRisingEdge: wID =
IDS_HelpPulseRetrigRising;break;
                                case cwpulseRetrigFallingEdge:      wID =
IDS_HelpPulseRetrigFalling;break;
                                case cwpulseFinite:                         wID =
IDS_HelpPulseFinite;            break;
                                case cwpulseSingle:                         wID =
IDS_HelpPulseSingle;            break;
                                case cwpulseContinuous:             wID =
IDS_HelpPulseContinuous;        break;
                                default: wID = IDS_HelpPulseTaskNotSupported;
                                break;
                                }
                        break;
                case kCfqVal8253:
                        switch (pPulse->GetPulseType()) {
                                case cwpulseContinuous:             wID =
IDS_HelpPulseContinuous;        break;
                                default: wID = IDS_HelpPulseTaskNotSupported;
                                break;
                                }
                        break;
                default: wID = IDS_HelpPulseTaskNotSupported;
                        break;
                }
```

```
        } else if (pCtrTimer->IsKindOf(RUNTIME_CLASS(CCWCounter))) {
            CCWCounter *pCtr = CCW_SAFECAST(pCtrTimer, CCWCounter);
            BOOL bBuf = pCtr->GetUseBuffering();

switch (ctrInfo.GetCtrType()) {
            case kCfqValAM9513:
            case kCfqValDAQSTC:
                switch (pCtr->GetMeasurementType()) {
                case cwctrEvents:
                    wID =
bBuf?IDS_HelpCtrEventsBuf:IDS_HelpCtrEvents;
                    break;
                case cwctrTime:              wID = IDS_HelpCtrTime;
        break;
                case cwctrFrequency:    wID = IDS_HelpCtrFrequency;
    break;
                case cwctrHiPulseWidth: wID = IDS_HelpCtrWidthHigh;
    break;
                case cwctrLoPulseWidth: wID = IDS_HelpCtrWidthLow;
    break;
                case cwctrSingleShotHiPulseWidth:   wID =
IDS_HelpCtrSingleShotHigh;     break;
                case cwctrSingleShotLoPulseWidth:   wID =
IDS_HelpCtrSingleShotLow;      break;
                case cwctrPulsePeriodRisingEdge:    wID =
IDS_HelpCtrPeriodRising;       break;
                case cwctrPulsePeriodFallingEdge:   wID =
IDS_HelpCtrPeriodFalling;      break;
                case cwctrSemiPeriods:                      wID =
IDS_HelpCtrSemi;               break;
                }
                break;
            case kCfqVal8253:
                switch (pCtr->GetMeasurementType()) {
                case cwctrEvents: wID = IDS_HelpCounterICtr;
    break;
                default: wID = IDS_HelpCtrTaskNotSupported;
        break;
                }
                break;
            default: wID = IDS_HelpCtrTaskNotSupported;
                break;
            }
        } if (wID == IDS_HelpCtrTaskNotSupported || wID ==
IDS_HelpPulseTaskNotSupported)
            m_bNotSupported = TRUE;
    else
            m_bNotSupported = FALSE;

strHelp.LoadString(wID);
    GetDlgItem(IDC_PPPCTR_HELP)->SetWindowText(strHelp);  // relative
to screen // Determine signal names and pin numbers
    CHardwareDatabase hwdb;
    hwdb.SetDeviceNumber(pCtrTimer->GetDevice());
```

```
        CString strTmpPin;
        int32 lPin;

m_strOutPin.Empty();
        m_strConSrc.Empty();
        m_strConDst.Empty();
        m_strGatePin.Empty();
        m_strTBPin.Empty();

m_bTwoCounters = FALSE;
        m_bUseOutput = FALSE;
        m_bUseGate = FALSE;
        m_bInvalidHW = FALSE;
        BOOL bUseTBSettings = FALSE;

int32 lGateCounter = pCtrTimer->GetCounter();

if (pCtrTimer->IsKindOf(RUNTIME_CLASS(CCWPulse))) {
                CCWPulse *pPulse = CCW_SAFECAST(pCtrTimer, CCWPulse);
                if (pPulse->GetPulseType() == cwpulseFinite) {
                        m_bTwoCounters = TRUE;
                        lGateCounter = ctrInfo.PrevCtr();
                }
                m_bUseOutput = TRUE;
                bUseTBSettings = (pPulse->GetInternalClockMode() ==
cwpulseTimebase);
        } else if (pCtrTimer->IsKindOf(RUNTIME_CLASS(CCWCounter))) {
                CCWCounter *pCtr = CCW_SAFECAST(pCtrTimer, CCWCounter);
                if (pCtr->GetMeasurementType()== cwctrFrequency) {
                        m_bTwoCounters = TRUE;
                        lGateCounter = ctrInfo.PrevCtr();
                }
                bUseTBSettings = TRUE;
        }

// Make a CtrInfo object for the coutner that TB and Gate settigns
will effect
        CDaqCounterInfo ctrInfoGate(pCtrTimer->GetDevice(), lGateCounter);

// Get the label for the gate if it is used (it is always used on
8253 devices)
        if (pCtrTimer->GetGateUsed() || ctrInfo.GetCtrType() ==
kCfqVal8253) {
                m_bUseGate = TRUE;
                ctrInfoGate.GetCtrGateSigName(pCtrTimer->GetGateSource(),
pCtrTimer->GetGateSignal(), m_strGateSig, strTmpPin);
                hwdb.GetPinNumber(strTmpPin, lPin);
                if (lPin > 0 )
                        m_strGatePin.Format("pin %d", lPin);
        } if (bUseTBSettings) {
                ctrInfo.GetCtrTBSigName(pCtrTimer->GetTimebaseSource(),
pCtrTimer->GetTimebaseSignal(), m_strTBSig, strTmpPin);
                hwdb.GetPinNumber(strTmpPin, lPin);
```

```
                if (lPin >0 )
                        m_strTBPin.Format("pin %d", lPin);
        } else {
                        m_strTBSig.Format("Internal Clk");
        }

// If two coutners and its AM9513 then the user will have to wire
up the counters
        // get the pin numbers for the interconnection.
        if (m_bTwoCounters) {
                if (ctrInfo.GetCtrType() == kCfqValAM9513) {
                        // Get labels for connecting two counters
                        ctrInfoGate.GetCtrPinName(kCfqAttrCtrPinNamesOut,
strTmpPin);
                        hwdb.GetPinNumber(strTmpPin, lPin);
                        if (lPin > 0)
                                m_strConSrc.Format("%d", lPin);

ctrInfo.GetCtrPinName(kCfqAttrCtrPinNamesGate,
strTmpPin);
                        hwdb.GetPinNumber(strTmpPin, lPin);
                        if (lPin > 0)
                                m_strConDst.Format("%d", lPin);
                } else if (ctrInfo.GetCtrType() == kCfqVal8253) {
                        m_bInvalidHW = TRUE;
                }
        }

// Get the label for the output pin if it is used.
        if (m_bUseOutput) {
                ctrInfo.GetCtrPinName(kCfqAttrCtrPinNamesOut, m_strOutSig);
                hwdb.GetPinNumber(m_strOutSig, lPin);
                if (lPin > 0)
                        m_strOutPin.Format("pin %d", lPin);
                m_strOutSig.MakeLower();
        } m_bHelpValid = TRUE;
}
//------------------------------------------------------------------
------
void DrawSegment(CPaintDC *pdc, CPoint pt1, CPoint pt2, BOOL bHFirst);
void DrawWire(CPaintDC *pdc, CString &strSig, CString& strPin, CPoint
pt,
                        int16 wWidth, BOOL bLeft, BOOL bGrey);
void DrawLine(CPaintDC *pdc, int16 x1, int16 y1, int16 x2, int16 y2,
BOOL bGrey);

class CClockBlock {
public:
                        CClockBlock(int16 x, int16 y, CString strTitle);
        CPoint   GetPoint(int16 wPin);
        void   Render(CPaintDC *pdc);
private:
        CRect   m_rcBounds;
        CString m_strTitle;
};

CClockBlock::CClockBlock(int16 x, int16 y, CString strTitle)
```

```
{
      m_rcBounds.SetRect(x, y, x+40, y+50);
      m_strTitle = strTitle;
}

CPoint CClockBlock::GetPoint(int16 wPin)
{
      CPoint pt;
      switch (wPin) {
      case 1:      pt.x= m_rcBounds.left;   pt.y = m_rcBounds.top+8;
break;
      case 2:      pt.x= m_rcBounds.left;   pt.y = m_rcBounds.top+40;
break;
      case 3:      pt.x= m_rcBounds.right;  pt.y = m_rcBounds.top+23;
break;
      }
      return pt;
} void CClockBlock::Render(CPaintDC *pdc)
{
      CBrush brClock;
      int    wAlign;
      brClock.CreateSolidBrush(RGB(0, 255, 0));
      pdc->FrameRect(m_rcBounds, &brClock);
      wAlign = pdc->SetTextAlign(TA_LEFT);
      pdc->TextOut(m_rcBounds.left+2, m_rcBounds.top, "source");
      pdc->TextOut(m_rcBounds.left+2, m_rcBounds.top+33, "gate");
      pdc->SetTextAlign(TA_RIGHT);
      pdc->TextOut(m_rcBounds.right-3, m_rcBounds.top+15, "out");
      pdc->SetTextAlign(TA_CENTER);
      pdc->TextOut(m_rcBounds.left+20, m_rcBounds.bottom+2, m_strTitle);
      pdc->SetTextAlign(wAlign);
} void CPPCtrPreview::DrawWire(CPaintDC *pdc, CString &strSig, CString
&strPin, CPoint pt,
                  int16 wWidth, BOOL bLeft)
{
      // Draws a label with wire to the point specified.
      // Thre current pen settings are usd to draw the line.
      CSize sz    = pdc->GetTextExtent(strSig);
      if (sz.cx > wWidth-5)   // If label is too big then grow it
            wWidth = sz.cx+5; // allow room for some wire
      CPoint pt2 = pt;
      int16 l1Offset, l2Offset;
      int16 wOldAlign;
      BOOL bGrey = strPin.IsEmpty();
      BOOL bShowPin = !bGrey && m_bShowPins;
      if (!bShowPin) {
            l1Offset = - (2*sz.cy/3);
      } else {
            l1Offset = - sz.cy;
            l2Offset = 0;
      } if (bLeft) {
            wOldAlign = pdc->SetTextAlign(TA_LEFT);
            pdc->TextOut(pt.x - wWidth, pt.y + l1Offset, strSig);
```

```
                if (bShowPin)
                        pdc->TextOut(pt.x - wWidth, pt.y + l2Offset, strPin);
                pt.x = pt.x - (wWidth-(sz.cx+5));
        } else {
                wOldAlign = pdc->SetTextAlign(TA_RIGHT);
                pdc->TextOut(pt.x + wWidth, pt.y + l1Offset, strSig);
                if (bShowPin)
                        pdc->TextOut(pt.x + wWidth, pt.y + l2Offset, strPin);
                pt2.x = pt.x + (wWidth-(sz.cx+5));
        }

DrawLine(pdc, pt.x, pt.y, pt2.x, pt2.y, bGrey);
        pdc->SetTextAlign(wOldAlign); // restore alignment
} void DrawSegment(CPaintDC *pdc, CPoint pt1, CPoint pt2, BOOL bHFirst,
BOOL bGrey)
{
        // Draws L shaped wire
        if (bHFirst) { // Do horizontal first
                DrawLine(pdc, pt1.x, pt1.y, pt2.x, pt1.y, bGrey);
                DrawLine(pdc, pt2.x, pt1.y, pt2.x, pt2.y, bGrey);
        } else {
                DrawLine(pdc, pt1.x, pt1.y, pt1.x, pt2.y, bGrey);
                DrawLine(pdc, pt1.x, pt2.y, pt2.x, pt2.y, bGrey);
        }
}

//----------------------------------------------------------------------
------
short kGreyPattern[] = {0xcc, 0xcc, 0x33, 0x33, 0xcc, 0xcc, 0x33, 0x33};
void DrawLine(CPaintDC *pdc, int16 x1, int16 y1, int16 x2, int16 y2,
BOOL bGrey)
{ if (bGrey) {
                CBitmap      bitmap;
                bitmap.CreateBitmap(8, 8, 1, 1, (LPSTR)kGreyPattern);
                CBrush greybrush(&bitmap);
                CBrush       *pbrushOld;

pbrushOld = pdc->SelectObject(&greybrush);
                int16 x = min (x1, x2);
                int16 y = min (y1, y2);
                if (y1 == y2)
                        pdc->PatBlt(x, y, abs(x1-x2), 1, 0xfa0089);
                else
                        pdc->PatBlt(x, y, 1, abs(y1-y2), 0xfa0089);

pdc->SelectObject(pbrushOld);
        } else {
                pdc->MoveTo(x1,y1);
                pdc->LineTo(x2,y2);
        }
}

//----------------------------------------------------------------------
------
```
K:\N\NATLINST\NATLINST2\21501\ni21501pat.doc

```
void CPPCtrPreview::OnPaint()
{
      CCWCtrTimer        *pCtrTimer = GetCCWCtrTimer();

CDaqCounterInfo ctrInfo(pCtrTimer->GetDevice(), pCtrTimer-
>GetCounter());
      COLORREF    clrFore = RGB(0, 255, 0);
      CPaintDC    dc(this);
      CPaintDC    *pdc = &dc;
      CString          strCtr;
      CRect       rcBounds;

RefreshHelpText();

GetDlgItem(IDC_PPPCTR_WIRE_PREVIEW)->GetWindowRect(&rcBounds); //
relative to screen
      ScreenToClient(&rcBounds); // map to pp client coords rcBounds.InflateRect(-1, -1);
      int16 left = rcBounds.left;
      int16 top = rcBounds.top;

// black background
      CBrush brBack;
      brBack.CreateSolidBrush(RGB(0, 0, 0));
      pdc->FillRect(rcBounds, &brBack);

if (!m_bNotSupported) {

// Set up the dc the way we want it.
            COLORREF clrOldText = pdc->SetTextColor(clrFore);
            COLORREF clrOldBk   = pdc->SetBkColor(0);
            int         wOldBkMode = pdc->SetBkMode(TRANSPARENT);
            HGDIOBJ     hOldFont   = SelectObject(pdc->m_hDC,
GetStockObject(DEFAULT_GUI_FONT));
            CPen   penWire(PS_SOLID, 1, clrFore);
            CPen   *ppenOld;
            CString  strEmpty;

ppenOld = pdc->SelectObject(&penWire);

strCtr.Format("Ctr %ld", pCtrTimer->GetCounter());
            if (!m_bTwoCounters) {
                  CClockBlock   ctr1(left+77, top+13, strCtr);
                  ctr1.Render(pdc);
                  DrawWire(pdc, m_strTBSig, m_strTBPin,
ctr1.GetPoint(1), 73, TRUE);
                  if (m_bUseGate)
                        DrawWire(pdc, m_strGateSig,  m_strGatePin,
ctr1.GetPoint(2), 73, TRUE);
                  if(m_bUseOutput)
                        DrawWire(pdc, m_strOutSig, m_strOutPin,
ctr1.GetPoint(3), 73, FALSE);
            } else {
                  CClockBlock   ctr2(left+157, top+13, strCtr);
                  strCtr.Format("Gate Ctr %ld", ctrInfo.PrevCtr());
```

```
                        CClockBlock  ctr1(left+77, top+13, strCtr);
                        ctr1.Render(pdc);
                        ctr2.Render(pdc);

CPoint pt = ctr1.GetPoint(1);
                        if (TRUE) {
                              BOOL bAutoWireTB = m_strTBPin.IsEmpty();
                              pt.x = pt.x - 8;
                              CPoint pt2 = ctr2.GetPoint(1);
                              CPoint pt3(pt2.x - 8, pt2.y-14);
                              DrawSegment(pdc, pt, pt3, FALSE, bAutoWireTB);
                              DrawSegment(pdc, pt3, pt2, FALSE, bAutoWireTB);
                              DrawWire(pdc, m_strTBSig, m_strTBPin, pt, 69,
TRUE);
                        } else {
                              DrawWire(pdc, m_strTBSig, m_strTBPin, pt, 75,
TRUE);
                        } if (m_bUseGate)
                              DrawWire(pdc, m_strGateSig,   m_strGatePin,
ctr1.GetPoint(2), 73, TRUE);
                        if(m_bUseOutput)
                              DrawWire(pdc, m_strOutSig, m_strOutPin,
ctr2.GetPoint(3), 73, FALSE);

BOOL bHandWire = !m_strConSrc.IsEmpty();
                        // Draw inter connecting wire
                        CPoint pt1 = ctr1.GetPoint(3);
                        CPoint pt2 = ctr2.GetPoint(2);
                        CPoint ptMid((pt1.x+pt2.x) / 2, pt1.y);
                        DrawSegment(pdc, pt1, ptMid, TRUE, !bHandWire);
                        DrawSegment(pdc, ptMid, pt2, FALSE, !bHandWire);

// Add pin numbers for connecting wires if needed
                        if (bHandWire && m_bShowPins) {
                              pdc->TextOut(pt1.x+1 , pt1.y+1, m_strConSrc);
                              pdc->SetTextAlign(TA_RIGHT);
                              pdc->TextOut(pt2.x-2, pt1.y +1, m_strConDst);
                        }
                  }

// Restore the DC
            pdc->SetTextColor(clrOldText);
            pdc->SetBkColor(clrOldBk);
            pdc->SetBkMode(wOldBkMode);
            SelectObject(pdc->m_hDC, hOldFont);
            pdc->SelectObject(ppenOld);
      }
} void CPPCtrPreview::OnLButtonDown(UINT nFlags, CPoint point)
{
      if (nFlags & MK_CONTROL) {
            m_bShowPins = !m_bShowPins;
            Invalidate();
      }
      CDialog::OnLButtonDown(nFlags, point);
}
```

```
//------------------------------------------------------------------
//------------------------------------------------------------------
//------------------------------------------------------------------
// © Copyright 1997 National Instruments
//
// DAQCounter.h
//
//   TGBTG
//
//{{CW_DOC(CDaqCounterInfo)
// CDaqCounterInfo provides information about a counter on a given
device.
// It does not represent ownership of a counter like CDaqCounter
//}}CW_DOC class CDaqCounterInfo
{
public:
        CDaqCounterInfo(long ldevice, long lCounter);
        BOOL  IsValid();
        int32 NextCtr();
        int32 PrevCtr();
        int32 GetCtrType()                         {return m_lCtrType;};
        int32 GetCtrSize()                         {return m_wSize;};
        int32    GetMaxCount()                     {return m_lLimit;};
        int32    BestTimebase(float32 lPhase);
        BOOL  ValidTimebase(float32 lTBsig);
        void  GetCtrGateSigName(int16 wGateSrc, int16 wGateSig, CString&,
CString&);
        void  GetCtrTBSigName(int16 wTBSrc, float32 fTBSig, CString&,
CString&);
        void  GetCtrPinName(uInt32 lAttId, CString &strPin, int32 lIndex =
-1);

private:
        void  DetermineCounterType();     // Used during construction
        int32 m_lCounters;
        int16 m_wDevice;
        int16 m_wCounter;                 // Counter index ( may be 0 or 1
based)
        int32 m_lCtrType;                 // Am9513, DAQ-STC, others someday
        int16 m_wSize;                    // 16/24
        int32 m_lLimit;                   // Maximum number it can count to
        int32 *m_plTimebases;             // Array of timebases
};
```

```
//------------------------------------------------------------------
//------------------------------------------------------------------
//------------------------------------------------------------------
// © Copyright 1997 National Instruments
//     CDaqCounterInfo
//
// DAQCounter.cpp
//
//   TGBTG
//
//  A Helper class that helps calculate settings based on
//------------------------------------------------------------------
CDaqCounterInfo::CDaqCounterInfo(int32 lDevice, int32 lCounter)
{
      m_wDevice   = lDevice;
      m_wCounter  = lCounter;
      DetermineCounterType();
}

//------------------------------------------------------------------
// until the new daq configuration
// tools exist this is the prescribed method for determining what kind
// of counter a device has.

static int32 gAM9513TB[]   = {1000000, 100000, 10000, 1000, 100, 0 };
static int32 gSTCTB[]      = {20000000, 100000, 0};
static int32 g8253_500TB[] = {1000000, 0};
static int32 g8253_1200TB[]= {2000000, 0};

void CDaqCounterInfo::DetermineCounterType()
{
      // stack class to access the hardware database
      CHardwareDatabase   hwdb;
      BOOL                bHasCoutners;

hwdb.SetDeviceNumber(m_wDevice);
      bHasCoutners = hwdb.GetAttr(kCfqAttrCtrType, m_lCtrType);
      if (!bHasCoutners)
            m_lCtrType = -1;

hwdb.GetAttr(kCfqAttrCtrNumGPCounters, m_lCounters);

switch(m_lCtrType) {
      //AM9513
      case kCfqValAM9513:
            m_plTimebases  = gAM9513TB;
            m_lLimit       = 65535;
            m_wSize        = 16;
            break;
      // 8253 (1200 series)
      case kCfqVal8253:
            {
            int32 lTypeCode;
            hwdb.GetAttr(kCfqAttrProdTypeCode, lTypeCode);
```

```
            if (lTypeCode == 4) {
                m_plTimebases      = g8253_1200TB;
            } else if (lTypeCode == 8) {
                m_plTimebases      = g8253_500TB;
            }
            m_lLimit   = 65535;
            m_wSize    = 16;
            }
            break;
        case kCfqValDAQSTC:
        default:
            m_plTimebases      = gSTCTB;
            m_lLimit   = 16777216;
            m_wSize    = 24;
        }
}
//-------------------------------------------------------------------
// Determine the next or previous counter according to the
// counter type
const int8 kAM9513NextCounter [] = {1, 1, 1, 1,-4};
const int8 kAM9513PrevCounter [] = {4,-1,-1,-1,-1};
const int8 kDAqSTCNextCtr       [] = {1,-1};
const int8 kDAqSTCPrevCtr       [] = {1,-1};
int32 CDaqCounterInfo::NextCtr()
{
        switch (m_lCtrType) {
        case kCfqValAM9513:
            return    m_wCounter + kAM9513NextCounter[(m_wCounter-1) %
5];
        case kCfqValDAQSTC :
            return    m_wCounter + kDAqSTCNextCtr[m_wCounter % 2];

default:
            return -1;
        }
}
int32 CDaqCounterInfo::PrevCtr()
{
        switch (m_lCtrType) {
        case kCfqValAM9513:
            return    m_wCounter + kAM9513PrevCounter[(m_wCounter-1) %
5];
        case kCfqValDAQSTC :
            return    m_wCounter + kDAqSTCPrevCtr[m_wCounter % 2];

default:
            return -1;
        }
}

//-------------------------------------------------------------------
// pick the best timebase for a given Phase. Best is considered the
// one that will count the highest while not overflowing before the
Phase
// elapses.
int32 CDaqCounterInfo::BestTimebase(float32 fPhase)
{
```

```
        long lTB;
        long lTimebase = -1;

for (int32 i =0; lTB = m_plTimebases[i]; i++) {
            if (lTB * fPhase <= m_lLimit) {
                lTimebase = lTB;
                break;

}
        }
        return lTimebase;
}
//------------------------------------------------------------------
-----------
BOOL CDaqCounterInfo::ValidTimebase(float32 fTBSig)
{
        BOOL bValid = FALSE;
        for (int32 i =0; !bValid && m_plTimebases[i]; i++) {
            if (fTBSig = m_plTimebases[i])
                bValid = TRUE;
        }
        return bValid;
}

//------------------------------------------------------------------
-----------
// Map a lowlevel tb signal definition into a more meaningful
description
void CDaqCounterInfo::GetCtrTBSigName(int16 wTBSrc, float32 fTBSig,
CString &strSig, CString &strPin)
{
        strPin.Empty();
        switch(wTBSrc) {
        case _cwctrNIDAQChoosesTB:;
        case _cwctrFrequencyTB:
            strSig.Format("Internal Clk");
            break;
        case _cwctrSourceNTB:
            if (fTBSig == -1)
                fTBSig = m_wCounter;
            strSig.Format("Ctr %d source",(int32)fTBSig);
            GetCtrPinName(kCfqAttrCtrPinNamesSrc, strPin,
(int32)fTBSig);
            break;
        case _cwctrGateNTB:
            if (fTBSig == -1)
                fTBSig = m_wCounter;
            strSig.Format("Ctr %d gate",(int32)fTBSig);
            GetCtrPinName(kCfqAttrCtrPinNamesGate, strPin,
(int32)fTBSig);
            break;
        case _cwctrTCNTB:
            if (fTBSig == -1)
                fTBSig = m_wCounter;
            strSig.Format("Ctr %d TC",(int32)fTBSig);
            //strPinName.Format("GPCTR%d_OUT",(int32)fTBSig);
            break;
        case _cwctrPFITB:
K:\N\NATLINST\NATLINST2\21501\ni21501pat.doc
```

```
                strSig.Format("PFI %d",(int32)fTBSig);
                strPin.Format("PFI%d",(int32)fTBSig);
                break;
        case _cwctrRTSITB:
                strSig.Format("RTSI %d",(int32)fTBSig);
                break;
        case _cwctrATCOutTB:
                strSig.Format("ATCOut");
                break;
        }
}

//------------------------------------------------------------------
------------
// Map a low level gate signal definition into a more meaningful
description
void CDaqCounterInfo::GetCtrGateSigName(int16 wGateSrc, int16 wGateSig,
CString &strSig, CString &strPin)
{
        strPin.Empty();
        switch(wGateSrc) {
        case _cwctrNIDAQChoosesGS:
        case _cwctrCtrGateGS:
                strSig.Format("Ctr %d gate", m_wCounter);
                GetCtrPinName(kCfqAttrCtrPinNamesGate, strPin);
                break;
        case _cwctrNextCtrGateGS:
                strSig.Format("Ctr %d gate", NextCtr());
                GetCtrPinName(kCfqAttrCtrPinNamesGate, strPin, NextCtr());
                break;
        case _cwctrPrevCtrGateGS:
                strSig.Format("Ctr %d gate", PrevCtr());
                GetCtrPinName(kCfqAttrCtrPinNamesGate, strPin, PrevCtr());
                break;
        case _cwctrPrevCtrTCGS:
                strSig.Format("Ctr %d TC", PrevCtr());
                break;
        case _cwctrPFIGS:
                strSig.Format("PFI %d", wGateSig);
                strPin.Format("PFI%d", wGateSig);
                break;
        case _cwctrRTSIGS:
                strSig.Format("RTSI %d", wGateSig);
                break;
        case _cwctrAIStartGS:
                strSig.Format("AIStart");
                strPin.Format("STARTSCAN", wGateSig);
                break;
        case _cwctrAIStopGS:
                strSig.Format("AIStop");
                break;
        case _cwctrATCOutGS:
                strSig.Format("ATCOut");
                break;
        }
}

// Return the pinname for a counters signal.
// valid attributes are:
K:\N\NATLINST\NATLINST2\21501\ni21501pat.doc
                                37
```

```
//        kCfqAttrCtrPinNamesGate
//        kCfqAttrCtrPinNamesOut
//        kCfqAttrCtrPinNamesSrc
void CDaqCounterInfo::GetCtrPinName(uInt32 lAttId, CString &strPinName,
int32 lCtr)
{
      uInt32     cElts = 20;
      uInt32     lCounters[20];
      uInt32     lIndex;
      BOOL   bFoundInfo;
      CHardwareDatabase hwdb;
      hwdb.SetDeviceNumber(m_wDevice);

// The default coutner is the one this CounterInfo object is
configured wiht.
      if (lCtr == -1)
            lCtr = m_wCounter;

strPinName.Empty();
      bFoundInfo = hwdb.GetAttrArray(kCfqAttrCtrGPCtrList, lCounters,
cElts);
      if (bFoundInfo) {
            for (lIndex = 0; lIndex < cElts; lIndex++) {
                  if (lCounters[lIndex] == (uInt32)lCtr) {
                        hwdb.GetIndexedAttr(lAttId, strPinName, lIndex);
                        break;
                  }
            }
      }
}
```

Conclusion

Therefore, a system and method for displaying DAQ device configuration information in response to program creation is shown and described. Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A data acquisition (DAQ) system which displays DAQ device configuration information in response to program creation, the DAQ system comprising:
    a computer system including a CPU, a memory, and a display screen;
    at least one data acquisition device coupled to the computer system, wherein the data acquisition device is operable to generate/receive data;
    a database stored in the memory of the computer system which stores information regarding DAQ devices;
    one or more DAQ software components stored in the memory of the computer system, wherein each of said one or more DAQ software components is operable to perform a data acquisition task, wherein each of said one or more DAQ software components is useable in creating an application program, wherein said one or more DAQ software components includes a first DAQ software component which performs a first data acquisition task;
    wherein, in response to said first DAQ software component being included in said application program, said first DAQ software component is operable to query said database to obtain information on said DAQ device and is operable to display a hardware block diagram on the display screen based on said obtained information, wherein said hardware block diagram includes one or more function blocks comprised in the DAQ device which are used in performing said first data acquisition task.

2. The DAQ system of claim 1, wherein said hardware block diagram displays restrictions and capabilities of the DAQ device.

3. The DAQ system of claim 1, wherein said hardware block diagram illustrates connections of said function blocks in the DAQ device which are used in performing said first data acquisition task.

4. The DAQ system of claim 3, wherein said hardware block diagram illustrates internal connections of said function blocks in a first display format;
    wherein said hardware block diagram illustrates connections of said function blocks which are required to be made by the user for the DAQ device to perform said first data acquisition task in a second display format.

5. The DAQ system of claim 1, wherein said database stores pin numbers and signal routing information for said DAQ devices;
    wherein said first DAQ software component is operable to query said database to obtain pin number information and signal routing information on said DAQ device, wherein said first DAQ software component is operable to display said hardware block diagram including pin numbers and signal routing of said function blocks.

6. The DAQ system of claim 1, wherein said first DAQ software component includes one or more user configurable properties, wherein said first DAQ software component is operable to query said database to obtain information on said DAQ device and to display an updated hardware block diagram in response to user changes to one or more of said properties.

7. The DAQ system of claim 6, wherein said DAQ system includes a plurality of DAQ devices including a first DAQ device and a second DAQ device;
    wherein said user configurable properties includes a DAQ device property which specifies one of said plurality of DAQ devices;
    wherein said DAQ device property is initially set to said first DAQ device;
    wherein, in response to a user change of said DAQ device property to specify second DAQ device, said first DAQ software component is operable to query said database to obtain information on said second DAQ device and to display a hardware block diagram including one or more function blocks comprised in the second DAQ device which are used in performing said first data acquisition task in response to said obtained information.

8. The DAQ system of claim 1, wherein said database includes a hardware database which stores hardware capability information regarding said DAQ devices.

9. The DAQ system of claim 1, wherein said database includes configuration information which specifies a current configuration of the DAQ system.

10. The DAQ system of claim 1, wherein said first DAQ software component comprises a re-useable software component which is useable in a plurality of different application programs.

11. The DAQ system of claim 10, wherein said first DAQ software component comprises a control adapted to be included in a container.

12. The DAQ system of claim 11, wherein said first DAQ software component is an ActiveX control.

13. The DAQ system of claim 1, further comprising:
    a development program stored in the memory of the computer system which is executable to create application programs for controlling the DAQ device;
    wherein said first DAQ software component is useable in said development program in creating an application program;
    wherein said first DAQ software component is operable to query said database and display said hardware block diagram in response to said first DAQ software component being used in said development program to create said application program.

14. A method for displaying data acquisition (DAQ) device configuration information in response to program creation in a DAQ system, the DAQ system comprising a computer system including a CPU, a memory, and a display screen, and at least one data acquisition device coupled to the computer system, the method comprising:
    including a first DAQ software component in an application program being created on the computer system, wherein said first DAQ software component performs a first data acquisition task;
    querying a database to obtain information on said DAQ device in response to said first DAQ software component being included in said application program;
    displaying a hardware block diagram on the display screen based on said obtained information, wherein said hardware block diagram includes one or more function blocks comprised in the DAQ device which are used in performing said first data acquisition task.

15. The method of claim 14, wherein said hardware block diagram displays restrictions and capabilities of the DAQ device.

16. The method of claim 14, wherein said displaying displays connections of said function blocks in the DAQ device which are used in performing said first data acquisition task.

17. The method of claim 16, wherein said displaying displays internal connections of said function blocks in a first display format;
wherein said displaying displays connections of said function blocks which are required to be made by the user for the DAQ device to perform said first data acquisition task in a second display format.

18. The method of claim 14, wherein said database stores pin numbers and signal routing information for said DAQ devices;
wherein said querying includes obtaining pin number information and signal routing information on said DAQ device;
wherein said displaying displays said hardware block diagram including pin numbers and signal routing of said function blocks.

19. The method of claim 14, wherein said first DAQ software component includes one or more user configurable properties, the method further comprising:
receiving at least one new value for one or more of said properties in response to user input;
querying the database to obtain information on said DAQ device in response to said receiving said new value; and
displaying an updated hardware block diagram on the display screen based on said obtained information and said new value.

20. The method of claim 19, wherein said DAQ system includes a plurality of DAQ devices including a first DAQ device and a second DAQ device;
wherein said user configurable properties includes a DAQ device property which specifies one of said plurality of DAQ devices;
wherein said DAQ device property is initially set to said first DAQ device;
wherein said receiving new values comprises receiving a new value specifying the second DAQ device;
wherein said querying comprises querying the database to obtain information on said second DAQ device in response to said receiving said new value specifying the second DAQ device;
wherein said displaying comprises displaying a hardware block diagram including one or more function blocks comprised in the second DAQ device which are used in performing said first data acquisition task.

21. The method of claim 14, wherein said database includes a hardware database which stores hardware capability information regarding said DAQ devices.

22. The method of claim 14, wherein said database includes configuration information which specifies a current configuration of the DAQ system;
wherein said querying includes querying the configuration information.

23. The method of claim 14, wherein said first DAQ software component comprises a re-useable software component which is useable in a plurality of different application programs.

24. The method of claim 23, wherein said first DAQ software component comprises a control adapted to be included in a container.

25. The method of claim 24, wherein said first DAQ software component is an ActiveX control.

26. The method of claim 14, further comprising:
executing a development program to create said application program;
wherein said including the first DAQ software component in said application program comprises using the first DAQ software component in said development program to create said application program;
wherein said querying and said displaying said hardware block diagram are performed in response to said first DAQ software component being used in said development program to create said application program.

27. The method of claim 14, wherein said first DAQ software component performs said querying said database and said displaying said hardware block diagram.

28. A data acquisition (DAQ) software component stored in the memory of a computer system, wherein the computer system is comprised in a DAQ system which includes the computer system and a DAQ device coupled to the computer system, wherein the DAQ software component displays DAQ device configuration information in response to program creation, the DAQ software component comprising:
a first DAQ function portion which is executable to perform a DAQ task;
wherein the DAQ software component is useable in creating an application program;
a display method, wherein, in response to the DAQ software component being included in said application program, the display method in the DAQ software component is operable to query a database to obtain information on the DAQ device and is operable to display a hardware block diagram on the display screen based on said obtained information, wherein said hardware block diagram includes one or more function blocks comprised in the DAQ device which are used in performing said DAQ task.

29. The DAQ software component of claim 28, wherein said hardware block diagram displays restrictions and capabilities of the DAQ device.

30. The DAQ software component of claim 28, wherein said hardware block diagram illustrates connections of the one or more function blocks in the DAQ device which are used and/or required in performing said DAQ task.

31. A memory media which stores a DAQ software component for displaying data acquisition (DAQ) device configuration information in response to program creation in a DAQ system, the DAQ system comprising a computer system including a CPU, a memory, and a display screen, and at least one data acquisition device coupled to the computer system;
wherein the DAQ software component performs a data acquisition task, wherein the DAQ software component is operable to be included in an application program being created on the computer system;
wherein the DAQ software component includes program instructions which are executable to implement:
querying a database to obtain information on the DAQ device in response to the DAQ software component being included in an application program;
displaying a hardware block diagram on the display screen based on said obtained information, wherein said hardware block diagram includes one or more function blocks comprised in the DAQ device which are used in performing said data acquisition task.

32. The memory media of claim 31, wherein said hardware block diagram displays restrictions and capabilities of the DAQ device.

33. The memory media of claim 31, wherein said hardware block diagram illustrates connections of said function blocks in the DAQ device which are used in performing said data acquisition task.

34. The memory media of claim 33, wherein said hardware block diagram illustrates internal connections of said function blocks in a first display format;

wherein said hardware block diagram illustrates connections of said function blocks which are required to be made by the user in a second display format.

35. The memory media of claim 31, wherein said database stores pin numbers and signal routing information for said DAQ devices;

wherein said querying includes obtaining pin number information and signal routing information of the DAQ device;

wherein said displaying displays said hardware block diagram including pin numbers and signal routing of said function blocks.

36. The memory media of claim 31, wherein said DAQ software component includes one or more user configurable properties, wherein the DAQ software component includes program instructions which are further executable to implement:

receiving at least one new value for one or more of said properties in response to user input;

querying the database to obtain information on said DAQ device in response to said receiving said new value; and displaying an updated hardware block diagram on the display screen based on said obtained information and said new value.

37. The memory media of claim 31, wherein said DAQ software component is operable to be used in a plurality of different programming development systems.

38. The memory media of claim 31, wherein said DAQ software component comprises a re-useable software component which is useable in a plurality of different application programs.

39. The memory media of claim 38, wherein said DAQ software component comprises a control adapted to be included in a container.

40. The memory media of claim 39, wherein said DAQ software component is an ActiveX control.

41. A system which displays device configuration information in response to program creation, the system comprising:

a computer system including a CPU, a memory, and a display screen;

at least one device coupled to the computer system, wherein the device performs a function;

a database stored in the memory of the computer system which stores information regarding devices;

one or more software components stored in the memory of the computer system, wherein each of said one or more software components is operable to perform a task, wherein each of said one or more software components is useable in creating an application program, wherein said one or more software components includes a first software component which performs a first task;

wherein, in response to said first software component being included in said application program, said first software component is operable to query said database to obtain information on said device and is operable to display a hardware block diagram on the display screen based on said obtained information, wherein said hardware block diagram includes one or more function blocks comprised in the device which are used in performing said first task.

42. The system of claim 41, wherein said hardware block diagram displays restrictions and capabilities of the device.

43. The system of claim 41, wherein said hardware block diagram illustrates connections of said function blocks in the DAQ device which are used in performing said first task.

44. The system of claim 43, wherein said hardware block diagram illustrates internal connections of said function blocks in a first display format;

wherein said hardware block diagram illustrates connections of said function blocks which are required to be made by the user in a second display format.

45. The system of claim 41, wherein said first software component includes one or more user configurable properties, wherein said first software component is operable to query said database to obtain information on said device and to display an updated hardware block diagram in response to user changes to one or more of said properties.

46. The system of claim 41, wherein said device is a data acquisition (DAQ) device;

wherein said first software component is a DAQ software component.

47. The system of claim 41, wherein said first software component comprises a re-useable software component which is useable in a plurality of different application programs.

48. A data acquisition (DAQ) system which displays DAQ device configuration information in response to program creation, the DAQ system comprising:

a computer system including a CPU and a memory;

at least one data acquisition device coupled to the computer system, wherein the data acquisition device is operable to generate/receive data;

a database stored in the memory of the computer system which stores information regarding DAQ devices;

a development program stored in the memory of the computer system which is executable to create an application program for controlling the DAQ device;

one or more DAQ software components stored in the memory of the computer system, wherein each of said one or more DAQ software components is operable to perform a data acquisition task, wherein each of said one or more DAQ software components is useable by said development program in creating said application program, wherein said one or more DAQ software components includes a first DAQ software component which performs a first data acquisition task;

wherein, in response to said first DAQ software component being included in said application program, said first DAQ software component is operable to query said database to obtain information on said DAQ device, wherein said first DAQ software component is operable to display a hardware model of the DAQ device performing said first data acquisition task in response to said obtained information.

49. A method for displaying device configuration information in response to program creation in a system, the system comprising a computer system including a CPU, a memory, and a display screen, and at least one device coupled to the computer system, the method comprising:

including a first software component in an application program being created on the computer system, wherein said first software component performs a first task;

querying a database to obtain information on said device in response to said first software component being included in said application program;

displaying a hardware block diagram on the display screen based on said obtained information, wherein said hardware block diagram includes one or more function blocks comprised in the device which are used in performing said first task.

50. The method of claim 49, wherein said hardware block diagram displays restrictions and capabilities of the device.

51. The method of claim 49, wherein said displaying displays connections of said function blocks in the device which are used in performing said first task.

52. The method of claim 51, wherein said displaying displays internal connections of said function blocks in a first display format;

wherein said displaying displays connections of said function blocks which are required to be made by the user for the device to perform said first task in a second display format.

53. The method of claim 49, wherein said software component includes one or more user configurable properties, the method further comprising:

receiving at least one new value for one or more of said properties in response to user input;

querying the database to obtain information on said device in response to said receiving said new value; and displaying an updated hardware block diagram on the display screen based on said obtained information and said new value.

54. The method of claim 49, wherein said database includes a hardware database which stores hardware capability information regarding said devices.

55. The method of claim 49, wherein said database includes configuration information which specifies a current configuration of the system;

wherein said querying includes querying the configuration information.

56. The method of claim 49, wherein said first software component comprises a re-useable software component which is useable in a plurality of different application programs.

57. The method of claim 49, further comprising:

executing a development program to create said application program;

wherein said including the first software component in said application program comprises using the first software component in said development program to create said application program;

wherein said querying and said displaying said hardware block diagram are performed in response to said first software component being used in said development program to create said application program.

58. The method of claim 49, wherein said first software component performs said querying said database and said displaying said hardware block diagram.

59. A memory media which stores a software component for displaying device configuration information in response to program creation in a system, the system comprising a computer system including a CPU, a memory, and a display screen, and at least one device coupled to the computer system;

wherein the software component performs a task, wherein the software component is operable to be included in an application program being created on the computer system;

wherein the software component includes program instructions which are executable to implement:

querying a database to obtain information on the device in response to the software component being included in an application program;

displaying a hardware block diagram on the display screen based on said obtained information, wherein said hardware block diagram includes one or more function blocks comprised in the device which are used in performing said data acquisition task.

60. The memory media of claim 59, wherein said hardware block diagram displays restrictions and capabilities of the device.

61. The memory media of claim 59, wherein said hardware block diagram illustrates connections of said function blocks in the device which are used in performing said task.

62. The memory media of claim 61, wherein said hardware block diagram illustrates internal connections of said function blocks in a first display format;

wherein said hardware block diagram illustrates connections of said function blocks which are required to be made by the user in a second display format.

63. The memory media of claim 59, wherein said software component includes one or more user configurable properties, wherein the software component includes program instructions which are further executable to implement:

receiving at least one new value for one or more of said properties in response to user input;

querying the database to obtain information on said device in response to said receiving said new value; and displaying an updated hardware block diagram on the display screen based on said obtained information and said new value.

64. The memory media of claim 59, wherein said software component comprises a re-useable software component which is useable in a plurality of different application programs.

* * * * *